(12) United States Patent
Matsui et al.

(10) Patent No.: US 12,117,632 B2
(45) Date of Patent: Oct. 15, 2024

(54) LAMINATE FILM

(71) Applicant: Toray Industries, Inc., Tokyo (JP)

(72) Inventors: Hisato Matsui, Otsu (JP); Yuji Matsuo, Otsu (JP); Wataru Gouda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 861 days.

(21) Appl. No.: 17/273,486

(22) PCT Filed: Sep. 4, 2019

(86) PCT No.: PCT/JP2019/034733
§ 371 (c)(1),
(2) Date: Mar. 4, 2021

(87) PCT Pub. No.: WO2020/054529
PCT Pub. Date: Mar. 19, 2020

(65) Prior Publication Data
US 2021/0341659 A1     Nov. 4, 2021

(30) Foreign Application Priority Data

Sep. 12, 2018   (JP) ................................. 2018-170397

(51) Int. Cl.
*G02B 5/26*        (2006.01)
*B32B 7/023*       (2019.01)
(Continued)

(52) U.S. Cl.
CPC ............... *G02B 5/26* (2013.01); *B32B 7/023* (2019.01); *B32B 27/08* (2013.01); *B32B 27/36* (2013.01);
(Continued)

(58) Field of Classification Search
CPC . G02B 5/26; G02B 5/28; G02B 5/286; G02B 5/30; G02B 5/3025; G02B 5/3041; B32B 7/023; B32B 27/36
See application file for complete search history.

(56) References Cited

U.S. PATENT DOCUMENTS

| 6,049,419 A | 4/2000 | Wheatley et al. |
| 9,459,386 B2 | 10/2016 | Hebrink et al. |

(Continued)

FOREIGN PATENT DOCUMENTS

| JP | 2002509279 A | 3/2002 |
| JP | 2003329841 A | 11/2003 |

(Continued)

OTHER PUBLICATIONS

International Search Report and Written Opinion for International Application No. PCT/JP2019/034733, dated Nov. 12, 2019, 6 pages.

*Primary Examiner* — Christopher Stanford
*Assistant Examiner* — Journey F Sumlar
(74) *Attorney, Agent, or Firm* — Buchanan Ingersoll & Rooney PC

(57) ABSTRACT

The laminate film is a laminate including 51 or more layers in which an A layer mainly composed of a thermoplastic resin A and a B layer mainly composed of a thermoplastic resin B, which is different from the thermoplastic resin A, are alternately laminated. A transmission spectrum X is obtained by exposing the film to linear polarized light (X wave) that oscillates in the alignment direction of the film over a range of wavelengths from 300 to 900 nm. A transmission spectrum Y is obtained by exposing the film to linear polarized light (Y wave) that oscillates in the direction perpendicular to the alignment direction of the film over a range of wavelengths from 300 to 900 nm. The area Amax (nm·%) of the largest region among regions enclosed by the (Continued)

transmission spectrum X and the transmission spectrum Y is 150 to 1500.

9 Claims, 8 Drawing Sheets

(51) Int. Cl.
*B32B 27/08* (2006.01)
*B32B 27/36* (2006.01)

(52) U.S. Cl.
CPC ..... *B32B 2250/05* (2013.01); *B32B 2250/244* (2013.01); *B32B 2270/00* (2013.01); *B32B 2307/418* (2013.01); *B32B 2307/516* (2013.01)

(56) References Cited

U.S. PATENT DOCUMENTS

| | | | |
|---|---|---|---|
| 9,945,994 | B2 | 4/2018 | Hebrink et al. |
| 2002/0015836 | A1 | 2/2002 | Jonza et al. |
| 2014/0287211 | A1 | 9/2014 | Oya et al. |

FOREIGN PATENT DOCUMENTS

| | | | |
|---|---|---|---|
| JP | 2005509179 | A | 4/2005 |
| JP | 2013511746 | A | 4/2013 |
| JP | 2013210598 | A | 10/2013 |
| JP | 2015533222 | A | 11/2015 |
| JP | 2016215643 | A | 12/2016 |
| WO | 2013057845 | A1 | 4/2013 |
| WO | 2016148141 | A1 | 9/2016 |

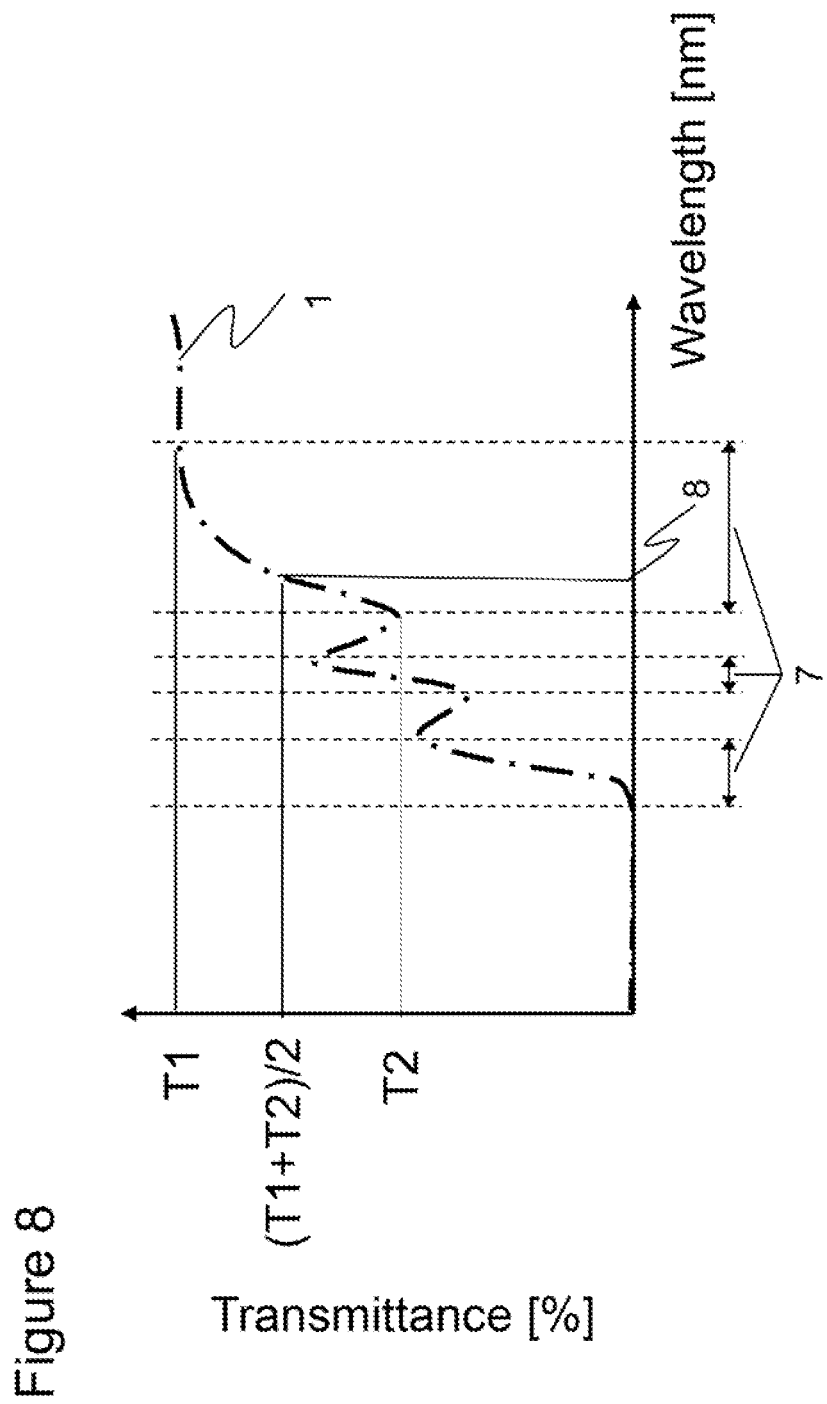

LAMINATE FILM

CROSS REFERENCE TO RELATED APPLICATIONS

This is the U.S. National Phase application of PCT/JP2019/034733, filed Sep. 4, 2019, which claims priority to Japanese Patent Application No. 2018-170397, filed Sep. 12, 2018, the disclosures of each of these applications being incorporated herein by reference in their entireties for all purposes.

FIELD OF THE INVENTION

The present invention relates to a laminate film having spectrum shift property as a characteristic optical feature.

BACKGROUND OF THE INVENTION

Light cutoff films that block light in particular wavelength ranges have been used in a wide variety of fields with the aim of preventing degradation of the internal environment and components of the film-containing products from environmental factors such as light and heat. Major examples include heat cutoff films for reducing a rise in indoor temperature used in the fields of building material and automobiles, ultraviolet cutoff films for absorbing excess ultraviolet ray from ultraviolet laser surface processing used in the field of industrial materials, and blue light cutoff films for shielding eyes from harmful blue light from light sources of displays used in the field of electronic information devices. In addition, light cutoff films are also used for restraining light degradation of the contents of containers in many other areas including foodstuffs, medical care, agriculture, and inks.

Useful methods for blocking light in particular wavelength ranges include light absorption (addition of light absorber etc.), light reflection, and combination thereof. A generally used method is the addition of a light absorber to a resin component of a film (Patent document 1). On the other hand, a method based on light reflection (Patent document 2) can be achieved by a layered structure containing a plurality of stacked resin layers that differ in refractive index. A sharp wavelength cutoff that cannot be achieved by the addition of a light absorber can be realized by accurately controlling the refractive index of each resin layer, thickness of each layer, number of layers, and distribution of layer thickness.

Disadvantages of light absorption and light reflection can be offset by using these methods in combination. Specifically, a light absorber that is effective for selective absorption of light with a particular wavelength in the reflection wavelength range is added to a film having a layered structure (Patent documents 3, 4, and 5). If this technique is used, sharp cutoffs can be achieved at the ends of the absorption wavelength range due to the effect of light reflection while sufficient light cutoff property can be realized in the cutoff wavelength range due to the effect of the light absorber. In addition, the required content of an absorber can be reduced largely by virtue of the effect of an increase in the optical path length resulting from multiple interference reflection in the layered structure. Furthermore, the existence of a plurality of interfaces in a laminate film works to prevent bleed-out of the light absorber added.

PATENT DOCUMENTS

Patent document 1: Japanese Unexamined Patent Publication (Kokai) No. 2013-210598

Patent document 2: Published Japanese Translation of PCT International Publication JP 2015-533222

Patent document 3: Published Japanese Translation of PCT International Publication JP 2013-511746

Patent document 4: Japanese Unexamined Patent Publication (Kokai) No. 2016-215643

Patent document 5: International Publication WO 2016/148141

SUMMARY OF THE INVENTION

It is known, however, that depending on the type and amount of the light absorber added, the method disclosed in the Patent document 1 can cause bleed-out of the light absorber around the nozzle, vacuum vent port, etc., during film production. If bleed-out occurs, it causes defects in the film due to contamination in the film production step and a decrease in light cutoff performance due to a decrease in the absorber concentration, which can result in deterioration in film quality. In many cases, furthermore, the use of a light absorber may serve to achieve a high cutoff performance in the absorption wavelength range whereas the absorption wavelength range tends to become broader due to the influence of basic skeletal structure such as molecular structure and side chains, leading to difficulty in blocking light only in an intended very narrow wavelength range.

In the case of the method disclosed in Patent document 2, on the other hand, although it can work very effectively in performing sharp wavelength cutoffs at specific wavelengths, there may occur cutoff failure in some portions of the reflection wavelength range, making it difficult to achieve complete light cutoff over the entire wavelength range. In addition, when a visible light region is included in the reflection wavelength range, the light reflected back into the front may be strongly visible and give rise to coloring.

In the case where reflection by a layered structure is used with the aim of cutting off light with wavelengths near the boundary between a visible light region and invisible light region (ultraviolet region, near infrared region, etc.), the reflection wavelength range can be shifted due to the influence of a slight change in thickness of the laminate film. Therefore, if the reflection wavelength range is shifted to overlap the visible light region, the incident light is likely to undergo specular reflection back into the front of the laminate film to cause the problem of strong coloring of the laminate film by the reflected light. To eliminate the influence of such a shift of the reflection wavelength range, it may be effective to add a light absorber that absorbs light in the region that is influenced by the shift of the reflection wavelength range, but most light absorbers that can absorb light in the visible light region, such as dyes and pigments, cannot serve as useful additives for light cutoff films because pigments have broad absorption wavelength ranges and dyes are low in light resistance though showing sharp absorption wavelength ranges.

The main object of the present invention is to provide a highly transparent laminate film with good light cutoff property that utilizes the effect of light reflection by a layered structure and serves for both sharp cutoff of light in a specific wavelength region and reduction of coloring caused by reflected light.

The present invention according to exemplary embodiments is configured as described below. Specifically, it provides:

a laminate film including 51 or more layers consisting of layers A each containing a thermoplastic resin A as primary component and layers B each containing a thermoplastic resin B, which is different from the thermoplastic resin A, as primary component that are stacked alternately, and meeting the relation of 150≤Amax≤1,500 wherein Amax (nm·%) represents the area of the largest of the regions surrounded by a transmission spectrum X and a transmission spectrum Y, the transmission spectrum X being a transmission spectrum obtained on a graph with wavelength (nm) on the horizontal axis and transmittance (%) on the vertical axis showing plotted results of observation in which a linearly polarized light (X wave) vibrating in the orientation direction of the film is used for irradiation over the wavelength range of 300 nm or more and 900 nm or less and the transmission spectrum Y being a transmission spectrum obtained on the graph with wavelength (nm) on the horizontal axis and transmittance (%) on the vertical axis showing plotted results of observation in which a linearly polarized light (Y wave) vibrating in the direction perpendicular to the orientation direction of the film is used for irradiation over the wavelength range of 300 nm or more and 900 nm or less.

The laminate film according to embodiments of the present invention is strongly oriented in an appropriate direction and utilizes a spectral shift resulting from this strong orientation, thus serving as a laminate film characterized by sharp cutoff property and weak reflection colors (high transparency) even when targeted for a specific wavelength region. In addition, the laminate film obtained has high in-plane orientation over the entire laminate film and accordingly will not suffer significant iridescent color unevenness characteristic of biaxially stretched crystalline resin film when irradiated with linearly polarized light, thus leading to high transparency and high visibility.

BRIEF DESCRIPTION OF THE DRAWINGS

FIG. 8 This is a schematic diagram showing another example of a cutoff wavelength λ in a transmission spectrum.

DETAILED DESCRIPTION OF EMBODIMENTS OF THE INVENTION

Figure 1:
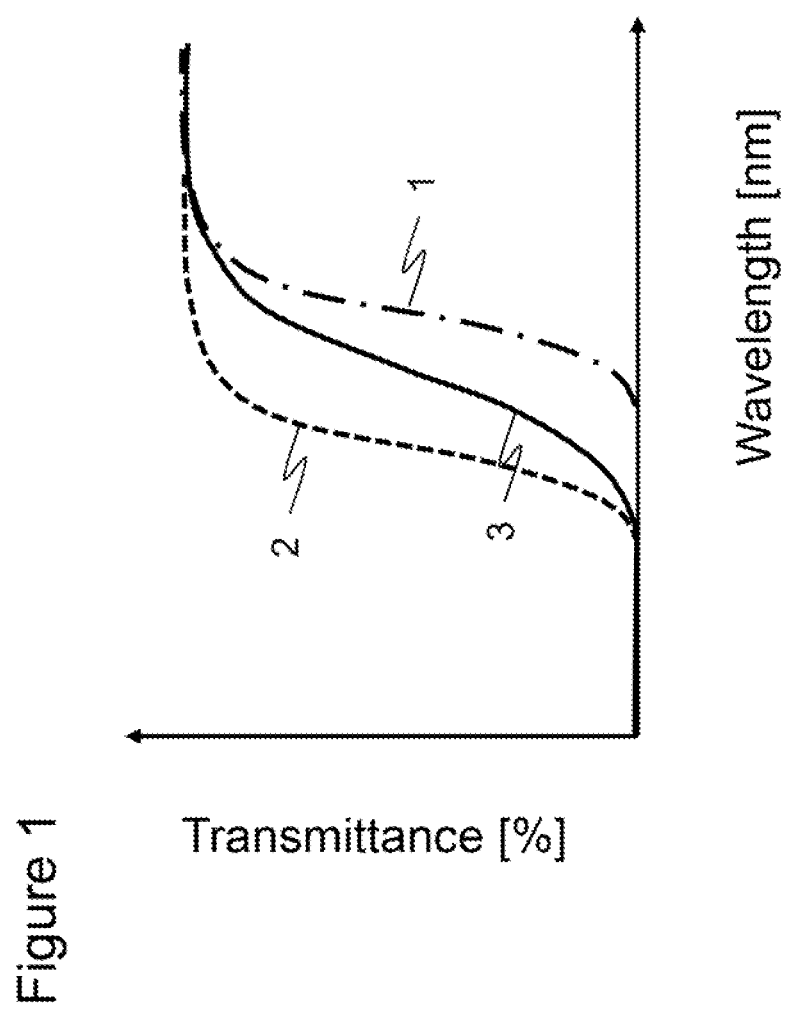
FIG. 1 This is a schematic diagram showing a transmission spectrum that is observed when a laminate film with spectral shift property is irradiated with linearly polarized light of either X wave or Y wave.

The laminate film according to embodiments of the present invention is described in detail below.

To solve the problem, the present inventors found that a laminate film strongly oriented in an arbitrary direction has spectral shift property to show different reflection wavelength ranges between the orientation direction and the direction perpendicular to the orientation direction. By virtue of this feature, sharp light cutoff property can be developed by applying polarized light vibrating in the orientation direction and in the direction perpendicular to the orientation direction, as compared to the application of natural light. Furthermore, since the light reflected back into the front of the laminate film is natural light, rather than polarized light, the reflected light is perceived as having a reflection color tone that corresponds to the average spectrum between the spectrum obtained when applying a polarized light vibrating in the orientation direction and that vibrating in the direction perpendicular to the orientation direction. Therefore, even when the intended wavelength range is designed to overlap both the visible light region and the invisible light region, it is possible to reduce the reflection color tone while maintaining sharp light cutoffs that are attributed to the light reflection design, thus enabling the production of a good light cutoff film that suffers little coloring.

In addition, stretching a film strongly in a specific direction in order to develop spectral shift property serves to cause the resin to be oriented uniformly in the stretching direction of the film, and accordingly, the iridescent color unevenness, which is an inherent problem with biaxially stretched crystalline films, can be reduced by applying polarized light in such a manner that the irradiation direction of the polarized light and the orientation direction of the laminate film coincide with each other.

The laminate film according to embodiments of the present invention is a laminate film including 51 or more layers consisting of layers A each containing a thermoplastic resin A as primary component and layers B each containing a thermoplastic resin B, which is different from the thermoplastic resin A, as primary component that are stacked alternately, and meeting the relation of 150≤Amax≤1,500 wherein Amax (nm·%) represents the area of the largest of the regions surrounded by a transmission spectrum X and a transmission spectrum Y, the transmission spectrum X being a transmission spectrum obtained on a graph with wavelength (nm) on the horizontal axis and transmittance (%) on the vertical axis showing plotted results of observation in which a linearly polarized light (X wave) vibrating in the orientation direction of the film is used for irradiation over the wavelength range of 300 nm or more and 900 nm or less and the transmission spectrum Y being a transmission spectrum obtained on the graph with wavelength (nm) on the horizontal axis and transmittance (%) on the vertical axis showing plotted results of observation in which a linearly polarized light (Y wave) vibrating in the direction perpendicular to the orientation direction of the film is used for irradiation over the wavelength range of 300 nm or more and 900 nm or less.

Useful materials for the thermoplastic resin A and thermoplastic resin B used in the laminate film according to embodiments of the present invention include, for example, polyolefin based resins such as polyethylene, polypropylene, poly(1-butene), poly(4-methyl pentene), polyisobutylene, polyisoprene, polybutadiene, polyvinyl cyclohexane, polystyrene, poly(α-methyl styrene), poly(p-methyl tyrene), polynorbornene, and polycyclopentene; polyamide based resins such as nylon 6, nylon 11, nylon 12, and nylon 66; copolymer based resins of vinyl monomers such as ethylene/propylene copolymer, ethylene/vinyl cyclohexane copolymer, ethylene/vinyl cyclohexane copolymer, ethylene/alkylacrylate copolymer, ethylene/acrylic methacrylate copolymer, ethylene/norbornene copolymer, ethylene/vinyl acetate copolymer, propylene/butadiene copolymer, isobutylene/isoprene copolymer, and vinyl chloride/vinyl acetate copolymer; acrylic resins such as polyacrylate, polymethacrylate, polymethyl methacrylate, polyacrylamide, and polyacrylonitrile; polyester based resins such as polyethylene terephthalate, polypropylene terephthalate, polybutylene terephthalate, and polyethylene-2,6-naphthalate; polyether based resins such as polyethylene oxide, polypropylene oxide, and polyacrylene glycol; cellulose ester based resins such as diacetyl cellulose, triacetyl cellulose, propionyl cellulose, butyryl cellulose, acetylpropionyl cellulose, and nitrocellulose; biodegradable polymers such as polylactic acid and polybutyl succinate; and others such as polyvinyl chloride, polyvinylidene chloride, polyvinyl alcohol, polyvinyl butyral, polyacetal, polyglycolic acid, polycarbonate, polyketone, polyether sulfone, polyether ether ketone, modified polyphenylene ether, polyphenylene sulfide, polyetherimide, polyimide, polysiloxane, tetrafluoroethylene resin, trifluoroethylene resin, trifluorochloroethylene resin, tetrafluoroethylene-hexafluoropropylene copolymer, and poly(vinylidene fluoride). These thermoplastic resins may be used singly or may be used as a polymer blend or a polymer alloy of two or more thereof. Their use as a blend or an alloy allows them to show properties that cannot be realized when used separately. Of these, polyester based resins are particularly preferred from the viewpoint of strength, heat resistance, and transparency, and preferred polyester based resins include those produced by polymerization of monomers that contain aromatic dicarboxylic acid or aliphatic dicarboxylic acid and diols as main components.

Here, useful aromatic dicarboxylic acids include, for example, terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenyl ether dicarboxylic acid, and 4,4'-diphenylsulfone dicarboxylic acid. Useful aliphatic dicarboxylic acids include, for example, adipic acid, suberic acid, sebacic acid, dimer acid, dodecanedioic acid, cyclohexane dicarboxylic acid, and ester derivatives thereof. Of these, particularly preferred ones include terephthalic acid and 2,6-naphthalene dicarboxylic acid. These acid components may be used singly or two or more thereof may be used in combination, and they may be partly copolymerized with an oxyacid such as hydroxybenzoic acid.

Also, useful diol components include, for example, ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2-bis(4-hydroxyethoxyphenyl) propane, isosorbate, and spiroglycol. In particular, the use of ethylene glycol is preferred. These diol components may be used singly or two or more thereof may be used in combination.

Of the above polyester based resins, preferred ones include those selected from polyethylene terephthalate and copolymers thereof, polyethylene naphthalate and copolymers thereof, polybutylene terephthalate and copolymers thereof, polybutylene naphthalate and copolymers thereof, polyhexamethylene terephthalate and copolymers thereof, polyhexamethylene naphthalate and copolymers thereof.

For the laminate film according to embodiments of the present invention, it is necessary for the thermoplastic resin B to be different from the thermoplastic resin A. Being different from the thermoplastic resin A specifically means that its refractive index differs from the refractive index of the thermoplastic resin A by 0.01 or more in any of the following directions: a randomly selected direction in the film plane, the in-plane direction perpendicular thereto, or the direction perpendicular to the film plane. If layers of different resins that differ in refractive index are stacked alternately, they can develop an optical interference reflection mechanism that realizes selective reflection of light of a specific wavelength based on the relation involving the differences in refractive index among these layers and the thickness of each layer. The reflected light wavelength ($\lambda$) is roughly determined by equation (1) from the thickness of each of the stacked thermoplastic resin layers and difference in refractive index between the thermoplastic resin A and the thermoplastic resin B and the reflectance (R) is roughly determined by equation (2) from the difference in refractive index between the thermoplastic resin A and the thermoplastic resin B. (Here, $n_A$ and $n_B$ are refractive index of the thermoplastic resin A and the refractive index of the thermoplastic resin B, respectively, and $d_A$ and $d_B$ represent the thickness of each layer; $\theta_A$ and $\theta_B$ are the incidence angle of light traveling from the A-layer into the B-layer and the incidence angle of light traveling from the B-layer into the A-layer, respectively, when viewed in the direction perpendicular to the laminate film; and k is an appropriately selected natural number.) If thermoplastic resins having the same refractive index are used to form the thermoplastic resin A and the thermoplastic resin B, the numerator in Equation (2) becomes 0 when, in particular, the incident light comes from the direction perpendicular to the plane, which means that interference reflection does not occur at the interface between the thermoplastic resin A and the thermoplastic resin B.

[Mathematical formula 1]

$$\lambda = 2(n_A d_A + n_B d_B)/k \qquad (1)$$

[Mathematical formula 2]

$$R = (n_A \cos \theta_A - n_B \cos \theta_B)^2 / (n_A \cos \theta_A + n_B \cos \theta_B)^2 \qquad (2)$$

For the laminate film according to the present invention, it is preferable to adopt a combination of thermoplastic resins that allows the absolute value of the solubility parameter (SP) of the thermoplastic resin A and that of the thermoplastic resin B differ by 1.0 or less. If the two thermoplastic resins are highly compatible, interlaminar peeling will not occur easily at the resin interface between the stacked layers. It is more preferable for the two thermoplastic resins used in combination to have the same basic skeletal structure. The basic skeletal structure referred to above means the repeating unit in the chemical structure of the main component of the resin. Thus, if polyethylene terephthalate is used for the thermoplastic resin A, for example, it is preferable for the thermoplastic resin B to contain the same ethylene terephthalate skeletal structure as in the polyethylene terephthalate in order to realize high accuracy lamination of the resin layers in the laminate film. In particular, if they are formed of resins having the same skeletal structure while having different optical characteristics, optical interference reflection can be utilized to realize high accuracy lamination while preventing interlaminar peeling at the interface between stacked layers.

To prepare resins having the same skeletal structure and different characteristics, a preferred method is to adopt copolymer resins as the polymer. For example, in the case where the thermoplastic resin A is polyethylene terephthalate, the resin to be used as the thermoplastic resin B may contain the ethylene terephthalate unit and a repeating unit including a dicarboxylic acid component or a diol component that can form an ester bond as a secondary component. It is preferable that the dicarboxylic acid component or the diol component to be added as secondary component accounts for 5 mol % or more relative to the dicarboxylic acid component or the diol component of the thermoplastic resin in order to develop different properties, whereas their content is preferably 45 mol % or less to ensure good interlaminar adhesion in the laminate film and also ensure thickness accuracy of each layer and thickness uniformity in view of the small difference in heat flow characteristics. It is more preferably 10 mol % or more and 40 mol % or less.

In the case where a thermoplastic resin having a polyethylene terephthalate skeletal structure is used as the thermoplastic resin, preferred copolymerization components include cyclohexane dimethanol, bisphenol A ethylene oxide, spiroglycol, isophthalic acid, isosorbide, cyclohexane dicarboxylic acid, diphenic acid, decalin acid, naphthalene dicarboxylic acid, polyethylene glycol 2000, m-polyethylene glycol 1000, m-polyethylene glycol 2000, m-polyethylene glycol 4000, m-polypropylene glycol 2000, bisphenylethylene glycol fluorene (BPEF), fumaric acid, and acetoxy benzoic acid. Of these, preferred ones include spiroglycol and 2,6-naphthalene dicarboxylic acid. If spiroglycol is used for copolymerization, the difference between its glass transition temperature and that of polyethylene terephthalate is so small that overstretching will be prevented in the molding step and interlaminar peeling will also be prevented. The use of 2,6-naphthalene dicarboxylic acid, which is a compound having two benzene rings bonded to each other, is preferred because it is more linear and has higher planarity and higher refractive index than terephthalic acid and accordingly serves effectively to increase the light reflectance.

The term "being stacked alternately" as used for the present invention means a state in which the thermoplastic resin A that forms the A-layer and the thermoplastic resin B that forms the B-layer are stacked in the thickness direction in a regular arrangement, and more specifically, the resins are stacked in the regular arrangement of A(BA)n (n being a natural number) or B(AB)n (n being a natural number). To produce a laminate film of A(BA)n (n being a natural number) or B(AB)n (n being a natural number), the plurality of thermoplastic resins for the thermoplastic resin A and the thermoplastic resin B are sent out from different flow channels using two or more extruders and combined in a generally known lamination apparatus such as multi-manifold type feedblock and static mixer. In particular, for efficient formation of a structure for the present invention, the use of a feedblock having fine slits is preferred to perform high accuracy lamination. When forming a laminate film using a slit-type feedblock, a desired individual layer thickness and thickness distribution among layers can be achieved by sloping the pressure loss by varying the slit length and width. The slit length is the length of the comb unit working to form flow channels that allow the A-layer and the B-layer to flow alternately in the slit plate.

To form a structure of A(BA)n (n being a natural number), it is preferable that the thermoplastic resin A, which is present in the outermost layer in the laminate film according to embodiments of the present invention, is a thermoplastic resin that shows crystallinity. This is preferred because a laminate film can be produced by a film production process similar to those used for single film structures containing crystalline thermoplastic resin as primary component. In the case where the thermoplastic resin A is an amorphous resin, a laminate film produced by a common biaxially stretching technique as described later may suffer problems such as defective film formation and surface deterioration due to sticking to components of the production apparatus such as rollers and clips. Furthermore, in the case where a crystalline polyester is used as the thermoplastic resin A, it is likely to show a large difference $\Delta n$ between the refractive index in the orientation direction and the refractive index in the direction perpendicular to the orientation direction or the direction perpendicular to the plane, thus serving to produce a laminate film having an adequate strength and a high reflectance.

It is necessary for the laminate film according to embodiments of the present invention to include 51 or more layers consisting of layers A each containing a thermoplastic resin A as primary component and layers B each containing a thermoplastic resin B, which is different from the thermoplastic resin A, as primary component that are stacked alternately. If layers of the thermoplastic resin A and those of the thermoplastic resins B that differ in refractive index are stacked alternately, they can develop an optical interference reflection mechanism that realizes selective reflection of light of a specific wavelength based on the relation involving the differences in refractive index among these layers and the thickness of each layer. A stack designed to contain 51 or more layers will develop a relatively high reflectance over an intended part of the reflection wavelength range, and as the number of layers is increased, the number of layers having thicknesses corresponding to reflection wavelengths increases in the thickness distribution to realize reflection in a broad wavelength range and higher reflectance. Accordingly, a larger number of layers allows the production of a laminate film that cuts off light in an intended wavelength range with higher accuracy. The number of layers in a laminate film is preferably 100 or more, more preferably 300 or more, and still more preferably 700 or more. There is no specific upper limit to the number of layers, but as the number of layers increases, a larger production cost will be required to purchase larger-size production equipment and the film thickness will become larger to cause a deterioration in handleability. In reality, therefore, the practical upper limit is 5,000.

For the laminate film according to the present invention, a light absorber may be added to any one of thermoplastic resin in the laminate film as described in detail later. Most light absorbers are low molecular weight components having a molecular weight of less than 1,000, and separation and vaporization (bleed-out) of a light absorber may occur at the surface in some cases in the film production process or long term durability test performed after film production. If it is added to a layer located at an inner position (for example the thermoplastic resin B in an A(BA)n type film (n being a natural number)), such a layered structure physically serves to reduce vaporization, although it is impossible in some cases to prevent bleed-out completely when the number of stacked layers is small. In the case of a laminate film containing 51 or more layers, the existence of interfaces between the layers works to hold the light absorber within the layers and prevent its separation from the film surface, thus providing an optical film that serves for long term use.

The laminate film according to embodiments of the present invention is characterized by the fact that when irradiated separately with linearly polarized light vibrating in the orientation direction of the film (X wave) and linearly polarized light vibrating in the direction perpendicular to the orientation direction of the film (Y wave), the laminate film gives different transmission spectra (FIG. 1). The orientation direction of a laminate film is influenced mainly by the draw ratio in the length direction and/or width direction in the biaxial stretching step described later, but the film may show complicated behaviors depending on the temperature distribution and shrinkage behavior in the stretching, heat treatment, and cooling steps, and therefore, the stretching direction (length direction, width direction) and the orientation direction of the laminate film do not necessarily coincide with each other. For the present invention, therefore, the parallel nicol rotation method is used optically to measure the refractive index for appropriate incident light (wavelength 590 nm), and the direction (slow phase axis direction) in which it reaches a maximum is defined as orientation direction. If measurement is impossible because light with a wavelength of 590 nm is reflected by the laminate film, an appropriate wavelength at which reflection does not occur may be selected from 480 nm, 550 nm, 630 nm, and 750 nm and used to determine the orientation direction. Specifically, a retardation measuring apparatus (KOBRA-21ADH, manufactured by Oji Scientific Instruments Co., Ltd.) is used for determination and, on the basis of the film's width direction as reference angle, the direction corresponding to the measured value of orientation angle is adopted as the film's orientation direction. In this measurement, the orientation direction is represented by a value of −90° or more and less than 90° where the clockwise direction is defined as "+". In this instance, the more oriented a laminate film is in the length direction, the larger orientation angle value (absolute value of orientation direction) the laminate film gives. The direction indicated by the orientation angle value obtained from the in-plane retardation measurement performed by the above retardation measuring apparatus is defined as the film's orientation (X axis) direction whereas the in-plane direction perpendicular to the orientation direction is defined as the Y axis direction. In addition, linearly polarized light obtained by extracting the light component vibrating only in the X axis direction is defined as X wave whereas linearly polarized light obtained by extracting the light component vibrating only in the Y axis direction is defined as Y wave.

Natural light is an electromagnetic wave having a uniform vibration distribution in an arbitrary direction, and linearly polarized light is a light component extracted from it and vibrates in a particular plane direction that includes a vibration direction of the electric field. For the laminate film according to the present invention, the spectrum obtained by applying linearly polarized light is of importance and the spectrophotometer uses linearly polarized light that is extracted from natural light emitted from a light source by using a linear polarizer. Major linear polarizers include polyvinyl alcohol (PVA)-iodine oriented film, Polaroid (registered trademark), and polarizing Nicol prism, but for the present invention, linearly polarized light is obtained through a Glan-Taylor polarizing prism (MGTYB20, manufactured by Karl Lambrecht) attached to a U-4100 spectrophotometer manufactured by Hitachi High-Tech Science Corporation.

The laminate film according to embodiments of the present invention is required to meet the relation of $150 \leq A_{max} \leq 1,500$ wherein $A_{max}$ (nm·%) represents the area of the largest of the regions surrounded by a transmission spectrum X and a transmission spectrum Y, the transmission spectrum X being a transmission spectrum obtained on a graph with wavelength (nm) on the horizontal axis and transmittance (%) on the vertical axis showing plotted results of observation in which a linearly polarized light (X wave) vibrating in the orientation direction of the film is used for irradiation over the wavelength range of 300 nm or more and 900 nm or less and the transmission spectrum Y being a transmission spectrum obtained on the graph with wavelength (nm) on the horizontal axis and transmittance (%) on the vertical axis showing plotted results of observation in which a linearly polarized light (Y wave) vibrating in the direction perpendicular to the orientation direction of the film is used for irradiation over the wavelength range of 300 nm or more and 900 nm or less.

In the case of a stretched film showing crystallinity, crystalline segments in the resin tend to align in the orientation direction to give a higher refractive index whereas the refractive index in the in-plane direction perpendicular to the orientation direction or in the thickness direction tends to decrease in reaction thereto. In this case, since the in-plane refractive index of the laminate film changes depending on the vibration direction of the applied polarized light, the difference between the in-plane refractive index of the laminate film in the vibration direction of the applied polarized light and the refractive index in the thickness direction which correspond to the polarization plane changes depending on the vibration direction of the applied polarized light, and the wavelength for interference reflection represented by Equation (1) also changes slightly. This difference in refractive index causes the phenomenon of a shift in the interference reflection wavelength between the orientation direction and the direction perpendicular thereto (spectral shift property). If this spectral shift property is utilized appropriately when polarized light vibrating in a specific direction is applied to a laminate film, a desired transmission spectrum can be obtained in the range between the transmission spectrum X that results from the application of a polarized X wave vibrating in the orientation direction and the transmission spectrum Y that results from the application of a polarized Y wave vibrating in the direction perpendicular to the orientation direction by appropriately adjusting the pasting direction of the laminate film.

The spectral shift property, which is the most important feature of embodiments of the present invention, is represented by the region surrounded by the aforementioned two transmission spectra, that is, the transmission spectrum X that results from the application of a polarized X wave vibrating in the film's orientation direction and the transmission spectrum Y that results from the application of a polarized Y wave vibrating in the direction perpendicular to the film's orientation direction, which gives the largest spectral shift. The term "transmission spectrum" used herein refers to a transmission spectrum determined by performing 10-point averaging for transmittance measurements taken at intervals of 1 nm using a spectrophotometer, as described later in relation to the measuring method. As described in detail later, spectrophotometric measurement is performed to obtain transmittance data over the range of 295 nm to 905 nm, and measurements taken from 10 consecutive points are averaged to provide transmittance data between 300 nm and 900 nm.

Figure 2:
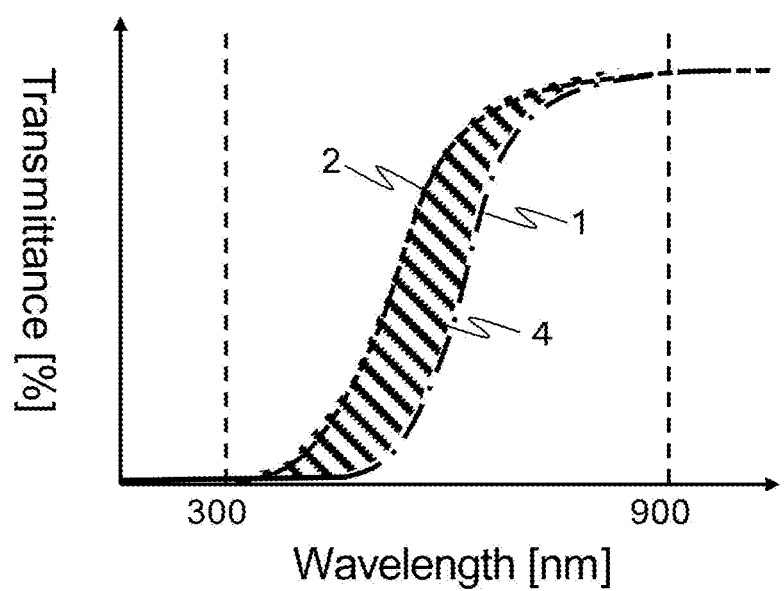
FIG. 2 This is a schematic diagram showing the region of Amax that is surrounded by the transmission spectrum X and the transmission spectrum Y.
Figure 3:
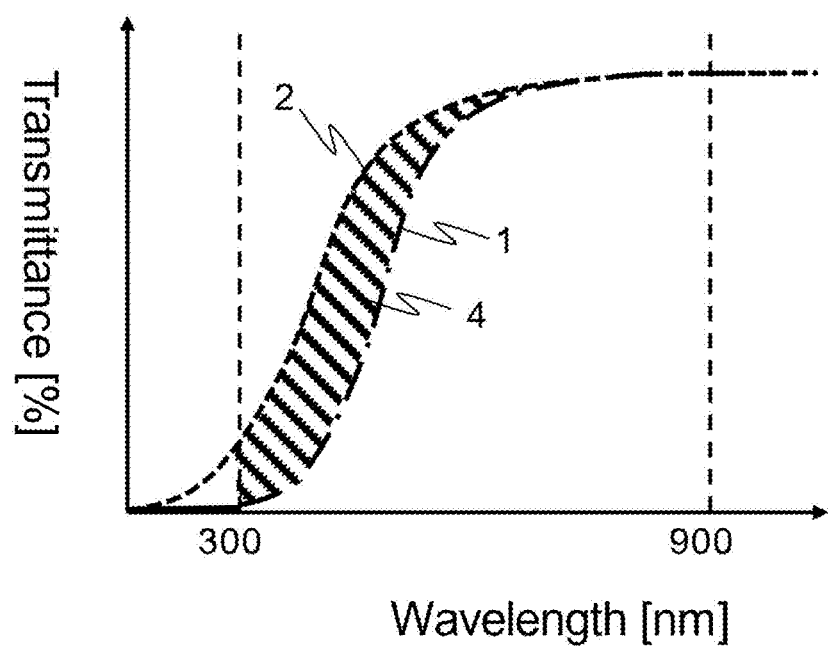
FIG. 3 This is a schematic diagram showing another example of the region of Amax that is surrounded by the transmission spectrum X and the transmission spectrum Y.
Figure 4:
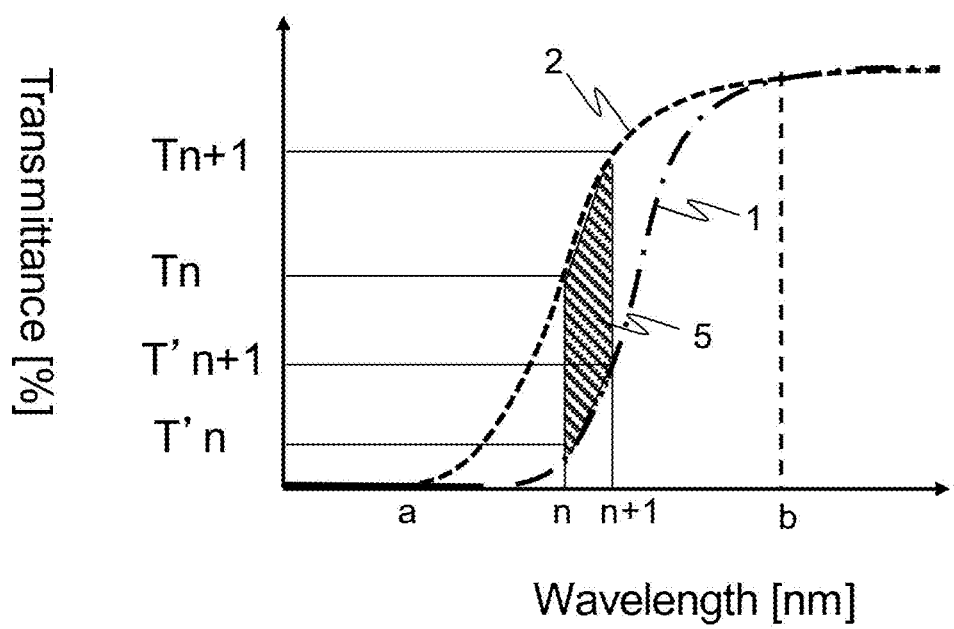
FIG. 4 This is a schematic diagram showing the procedure for calculating the region of Amax that is surrounded by the transmission spectrum X and the transmission spectrum Y.

The region surrounded by the two transmission spectra is represented specifically by the area $A_{max}$ (nm·%) of the largest of the regions surrounded by the two transmission spectra, that is, the transmission spectrum X and the transmission spectrum Y, plotted on a graph with wavelength (nm) on the horizontal axis and transmittance (%) on the vertical axis (FIGS. 2 and 3). If such a region surrounded by the two transmission spectra exists within the measured wavelength range as shown in FIG. 2, the area of that region is defined as $A_{max}$. On the other hand, if such a surrounded region partly overlaps the measured wavelength range as shown in FIG. 3, the area of the part where the surrounded region and the measured wavelength range overlap is defined as Amax. The area Amax of the largest region is roughly calculated by the trapezoidal method. FIG. 4 gives a schematic diagram showing the calculation procedure. The region surrounded by intersections are divided at intervals of 1 nm, and the area of the surrounded region is calculated by Equation (3) where $T'_n$ and $T_n$ are the X wave transmittance and the Y wave transmittance, respectively, at a shorter wavelength (wavelength of n [nm]) and $T'_{n+1}$ and $T_{n+1}$ are the X wave transmittance and the Y wave transmittance, respectively, at a longer wavelength (wavelength of n+1 [nm]).

[Mathematical formula 3]

$$\text{Amax} = \int_a^b \{(T_n - T'_n) + (T_{n+1} - T'_{n+1})\}/2 \, dn \quad (3)$$

(where a and b denote the wavelengths at the intersections of the transmission spectra and meet the relation of $300 \leq a < b \leq 900$.)

In the case where the area Amax (nm·%) of the largest of the regions surrounded by the two transmission spectra is less than 150, it means that the difference in the degree of orientation between the orientation direction of the laminate film and the direction perpendicular thereto is small, and the transmission spectra will not change significantly even if the applied polarized light is set in an arbitrary direction, which indicates that such a structure does not conform to the present conception. There is another conceivable structure that assumes the addition of a light absorber to the laminate film so that the absorption wavelength range of the light absorber overlaps the reflection wavelength range. In this case, even when an adequate difference in orientation is realized, the reflection wavelength ranges of the two spectra will be hidden behind the absorption wavelength range and such a structure does not conform to the conception of the present invention which makes use of the cutoff property attributed to interference reflection.

In the case where the area Amax of the largest of the regions surrounded by the two transmission spectra is more than 1,500, the laminate film is required to have a very large difference in orientation between the orientation direction and the direction perpendicular thereto, although depending largely on the orientation state of the constituent resin, and therefore, uniaxial stretching generally has to be performed in preparing a laminate film, which is not desirable because it can cause problems with the film production step or the product itself such as failure in producing a product having an sufficient product width and uniform performance, easy occurrence of tearing in the stretching direction, and serious degrees of unevenness in thickness due to stretching and associated in-plane unevenness in reflection wavelength range. To ensure good film production property and moderate spectral shift property, it is preferable for the value of Amax to meet the relation of $300 \leq \text{Amax} \leq 1,000$.

Figure 5:
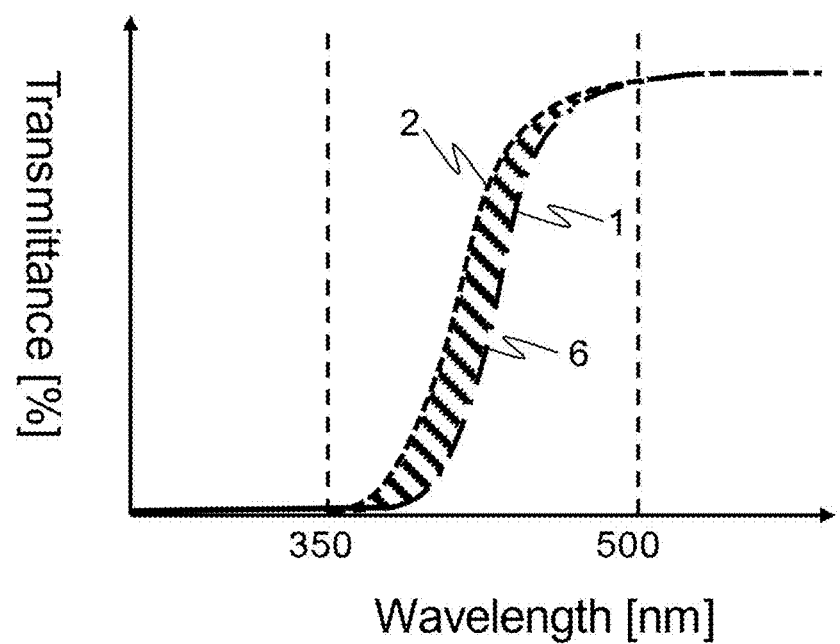
FIG. 5 This is a schematic diagram showing the region of $Amax_{350-500}$ that is surrounded by the transmission spectrum X and the transmission spectrum Y in the range of 350 nm or more and 500 nm or less.
Figure 6:
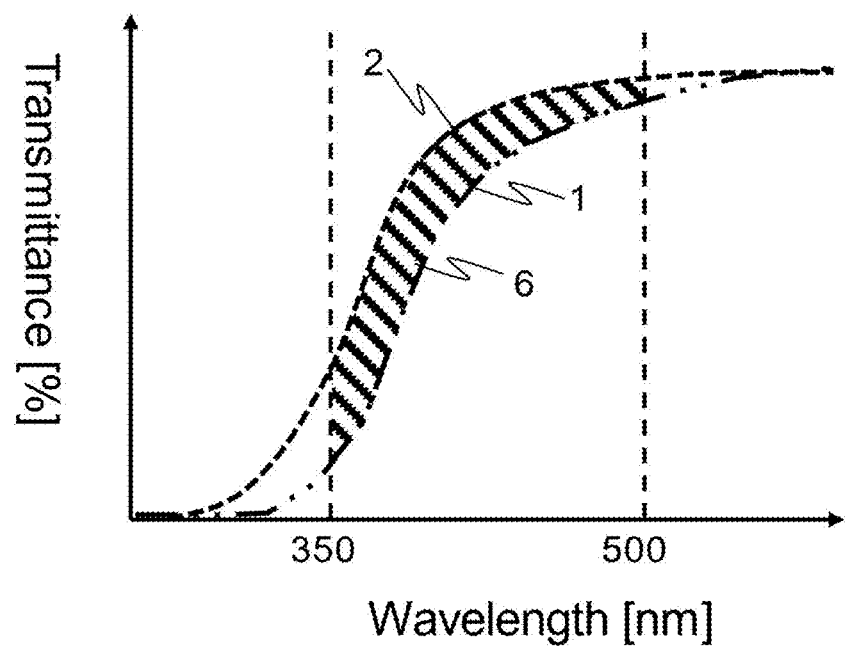
FIG. 6 This is a schematic diagram showing another example of the region of $Amax_{350-500}$ that is surrounded by the transmission spectrum X and the transmission spectrum Y in the range of 350 nm or more and 500 nm or less.

For the laminate film according to the present invention, it is preferable that at least part of the aforementioned Amax exists in the wavelength range of 350 nm or more and 500 nm or less. It is also preferable that the aforementioned Amax in the wavelength range of 350 nm or more and 500 nm or less ($\text{Amax}_{350-500}$) (see FIGS. 5 and 6) meets the relation of $150 \leq \text{Amax}_{350-500} \leq 1,500$. By targeting the spectral shift property at the wavelength range of 350 nm or more and 500 nm or less, it becomes possible to reduce the reflection color tone of a laminate film that is required to have cutoff property in an invisible light region (ultraviolet region) and blue visible light region and to realize colorless, transparent, sharp light cutoff.

On the other hand, the spectral shift property that is characteristic of the laminate film according to the present invention can be applied to the boundary between the red visible region and the near infrared region. In this case, if polarized light is applied in the direction perpendicular to the orientation direction, either of the transmission spectra that is shifted to a shorter wavelength, i.e. the transmission spectrum Y, will act to cut off a portion around the boundary between the red visible region and the near infrared region, thus serving for both reduction in red reflection color tone and development of near infrared light cutoff property.

In the case of cutting off light in the high energy visible (HEV) region in and around the wavelength range of 350 nm or more and 400 nm or less for displays, lenses of polarized glasses etc., for example, if a polarizing plate for display device, polarizing film for spectacle lens, etc., are designed to perform sharp cutoffs of light with a wavelength in the above range when irradiated with a polarized X wave vibrating in the orientation direction of the film, natural light passing through them will be converted by the laminate film according to embodiments of the present invention into a polarized X wave that has a transmission spectrum X and serves to protect components, such as display elements and yellow spots of eyes, that are susceptible to the influence of common HEV. However, since the present laminate film does not show spectral shift property under outdoor daylight reflection, which is natural light, the reflection performance is determined on the basis of the transmission spectrum Z calculated by averaging the transmission spectrum X and the transmission spectrum Y, thus resulting in more colorless transparent light compared to the reflection color tone expected from the transmission spectrum X. With these features, the present laminate film is used suitably for displays, lenses of polarized glasses etc.

In the case of cutting off blue visible light (blue light) in the wavelength range of 400 nm or more and 500 nm or less, blue light is reflected back more strongly into the front due to interference reflection, leading to a stronger reflection color tone, as the reflection wavelength range shifts to larger wavelengths, but the spectral shift property characteristic of the present laminate film makes it possible to reduce the intensity of the blue reflection color tone while performing sharp cutoff of blue light. It is more preferable for $\text{Amax}_{350-500}$ to be in the range of $300 \leq \text{Amax}_{350-500} \leq 1,000$.

For the laminate film according to embodiments of the present invention, the transmission spectrum Z calculated by averaging the transmission spectrum X and the transmission spectrum Y preferably has an optical density of 1.0 or more at a wavelength of 390 nm. The optical density referred to herein is calculated by Equation (4) from transmission spectrum measurements taken at a wavelength of 390 nm. Since the transmission spectrum Z is a transmission spectrum obtained by averaging the transmission spectra X and Y given by polarized light beams that are perpendicular to each other, it has properties similar to transmission spectra given by natural light. An optical density of 1.0 or more at a wavelength of 390 nm is preferred particularly in the case of a laminate film intended for use for blue light and high energy visible light (HEV) in and around the wavelength range of 350 nm or more and 400 nm or less because it can serve very effectively to protect components that are susceptible to the influence of HEV. The optical density at a wavelength of 390 nm is preferably as high as possible because it shows better cutoff property at the wavelength, and it is more preferably 2.0 or more. If the optical density is more than 5.0, it will be necessary, in the case of light absorption, to add a light absorber to an unnecessarily high concentration while it will be necessary, in the case of light reflection, to use an excessively large number of stacked layers. A decrease in transparency and an increase in bleed-out will occur in the former case whereas an increase in production cost and a decrease in handleability will occur in the latter case, and accordingly, it is preferable for the optical density to be 5.0 or less.

[Mathematical formula 4]

$$\text{Optical density } OD = -\log(T_{390}/100) \qquad (4)$$

(where $T_{390}$ denotes the transmittance [%] at a wavelength of 390 nm.)

Figure 7:
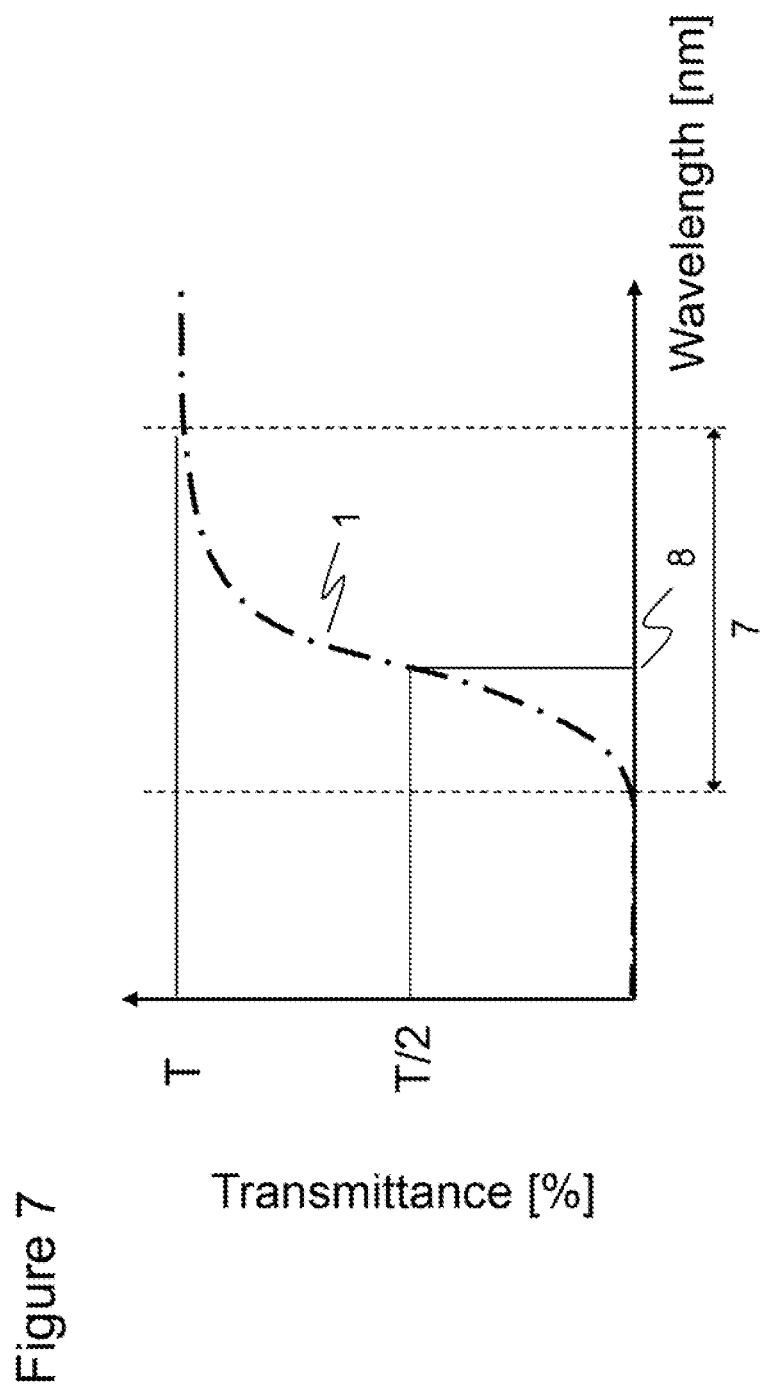
FIG. 7 This is a schematic diagram showing a cutoff wavelength λ in a transmission spectrum.

Regarding the cutoff wavelength λ of the aforementioned transmission spectrum X in the wavelength range of 350 nm or more and 500 nm or less in the film length direction of the laminate film according to the present invention, the difference between the maximum value λmax and the minimum value λmin, i.e. the variation width (λmax−λmin), is preferably 20 nm or less. Of the wavelength ranges where the transmittance increases continuously by 20% or more in the graph of the transmission spectrum X as shown in FIG. 7 and FIG. 8, the wavelength range located at the longest wavelength position is identified, and the wavelength corresponding to the half value (mid-value between the maximum transmittance and the minimum transmittance in that wavelength range) is defined as the cutoff wavelength for the present invention. For this evaluation as well, the transmission spectrum to be used is calculated by the 10-point averaging method. In the case where the transmittance increases continuously and monotonously as seen in FIG. 7, the wavelength corresponding to the mid-value between the maximum transmittance and the minimum transmittance is adopted as the cutoff wavelength. In the case where the transmittance increases and decreases repeatedly to give a plurality of wavelength ranges where the transmittance increases continuously by 20% or more as seen in FIG. 8, the wavelength range located at the longest wavelength position, among the wavelength ranges located between 350 nm or more and 500 nm or less, is identified, and the wavelength corresponding to the mid-value between the maximum value and the minimum value is adopted as the cutoff wavelength.

Useful methods to be used to produce a laminate film having such spectral shift property will be described in detail later, but for example, a good method is strong stretching in one particular direction to cause orientation. More specifically, biaxial stretching may be performed in such a manner that the film is stretched particularly strongly in either the length direction or the width direction of the film. When stretching a film in the length direction or in the width direction to achieve a high degree of orientation, thickness unevenness can be caused as the film width pulsates based on the Poisson ratio according to the roller-to-roller distances in the section where the film is stretched between rollers. In addition, if stretching unevenness occurs in the step for stretching in the length direction with the aim of increasing the stretching ratio in the length direction and decreasing the width of the film in order to achieve strong stretching in the width direction, thickness unevenness can occur after the stretching in the width direction. In the case of a laminate film having a regular structure, the thickness of the laminate film and the reflection wavelength range change in coordination, and accordingly, thickness unevenness can work to increase the spectral variation. This is not desirable for the present laminate film, which is intended for sharp cutoff in a specific wavelength range. Thus, the spectrum variation can be reduced to allow sharp cutoff property and weak reflection color tone to be achieved stably if the difference between the maximum value λmax and the minimum value λmin of cutoff wavelength, i.e. the variation width (λmax−λmin), is 20 nm or less when measuring the cutoff wavelength in the wavelength range of 350 nm or more and 500 nm or less in the length direction of the film. If the variation width (λmax−λmin) is more than 20 nm, the in-plane reflection color tone and intensity of the laminate film can change considerably due to a variation of the reflection wavelength range. The variation width (λmax−λmin) is more preferably 15 nm or less, still more preferably 10 nm or less. A good method to control the variation width (λmax−λmin) in the aforementioned range is to control the thickness unevenness under the stretching conditions described later.

It is preferable for the laminate film according to embodiments of the present invention to contain a light absorber to ensure enhanced cutoff performance in the reflection wavelength range. A light absorber may be added to either the A-layer, which contains the thermoplastic resin A as primary component, or the B-layer, which contains the thermoplastic resin B as primary component, or to both the A-layer and the B-layer. When performing a technique for light reflection using the A-layer and the B-layer stacked alternately as in the case of laminate film according to embodiments of the present invention, the difference in refractive index between the thermoplastic resin A and the thermoplastic resin B and the wavelength dependence of their refractive indices vary depending on the combination of two thermoplastic resins and the stretching and heat treatment steps, and the transmission spectra also vary depending on the layer thickness distribution and the film thickness. Therefore, it is not easy to realize complete light cutoff over the entire reflection wavelength range. Accordingly, the combination of light absorption by a light absorber and light reflection by alternately stacked layers serves to develop good light cutoff property more effectively. In the case where light absorption and light reflection are utilized in combination, it is good to design a structure so that the wavelengths of light absorbed by the light absorber partially overlaps the reflection wavelength range because in that case, the optical path length increases due to the effect of multiple interference reflection in the layered structure, thereby causing an increase in the absorption efficiency in comparison with the case where the reflection wavelength range does not overlap the absorption wavelength range of the light absorber. This permits easy achievement of a complete cutoff of ultraviolet light. Furthermore, in comparison to the case where a cutoff of light is achieved only by light absorption, the content of the light absorber can be decreased, thus realizing an advantage in terms of reducing its separation (bleed-out) from the film surface.

Such a light absorber may be added as an additive in the thermoplastic resin or may be copolymerized with the thermoplastic resin to reduce bleed-out more effectively. To be effective for the wavelength range of 350 nm or more and 500 nm or less, good light absorbers include ultraviolet absorbers and HEV-absorbing pigments, and most of these light absorbers are low in molecular weight. Light absorbers that are not high in molecular weight, however, can cause problems that lead to quality deterioration, such as volatilization in the air at the time of melt-extrusion into a sheet and separation from the film surface during a heat treatment step or reliability test. Therefore, copolymerization with a thermoplastic resin, rather than isolated addition, serves effectively to allow an ultraviolet absorber to stay within the added layer, and therefore, the problem of bleed-out can be eliminated even when adding it to the outermost A-layer formed of the thermoplastic resin A. When performing copolymerization with a thermoplastic resin, for example when copolymerizing a polyester based thermoplastic resin with an ultraviolet absorber, a good method is to react the hydroxy terminal group, which is contained in most ultraviolet absorbers, with the carboxyl terminal group in the polyester resin through an ester interchange reaction etc.

It is preferable that a light absorbent is contained only in the B-layer disposed in the interior of the laminate film or contained in a larger amount in the B-layer disposed in the interior of the laminate film than in the A-layer that has the chance to be disposed at an outer surface of the laminate film. In particular, in the case where the laminate film according to embodiments of the present invention is a laminate film consisting of layers stacked alternately in such a manner that the A-layer is disposed at both surfaces, it is preferable that a light absorber is contained only in the B-layer. In the case where it is incorporated in A-layers including the outermost layer, a layer containing crystalline resin has only a small volume of amorphous regions that can retain an additive and therefore tends to suffer bleed-out as described above and sublimation and vaporization near the nozzle, possibly leading to contamination of the film production machine and troubles caused by separated material in the manufacturing process. In the case where it is incorporated only in B-layers that are disposed in the interior, the outermost A-layer that contains the thermoplastic resin A as primary component plays the role of a lid to prevent the separation of the ultraviolet absorber, which is preferred because it reduces bleed-out.

The content of a light absorber is preferably 2.5 percent by weight (wt %) or less, more preferably 1.5 wt % or less, and still more preferably 1.0 wt % or less, relative to the total weight of the laminate film. If the content is more than 2.5 wt %, bleed-out is likely to occur due to the excessive existence of the additive and cause whitening of the laminate film, possibly leading to a decrease in light transmittance and an increase in haze.

For the laminate film according to embodiments of the present invention, useful light absorbers include ultraviolet light absorbers, visible light absorbers, and infrared light absorbers that can absorb light in a desirable range, of which ultraviolet absorbers are preferred. Useful ultraviolet light absorbers include organic ultraviolet light absorbers having different skeletal structures such as benzotriazole based, benzophenone based, benzoate based, triazine based, benzoxazine based, and salicylic acid based ones. In particular, it is preferable to select from among benzotriazole based and/or triazine based ultraviolet light absorbers, which generally have high heat resistance and serve efficiently for light absorption with low concentrations. Use of inorganic ultraviolet light absorbers is not preferred for the laminate film according to embodiments of the present invention because they are generally incompatible with thermoplastic resins and act to increase the haze and decrease the transparency of the laminate film. When using two or more ultraviolet light absorbers in combination, the ultraviolet light absorbers may have the same skeletal structure or the ultraviolet light absorbers may have different skeletal structures. Specific examples are given below, wherein the compounds suffixed with (*) serve as ultraviolet light absorbers having a maximum wavelength in the wavelength range of 320 nm or more and 380 nm or less.

Examples of benzotriazole based ultraviolet light absorbers include, but not limited to, 2-(2'-hydroxy-5'-methylphenyl) benzotriazole(*), 2-(2'-hydroxy-3',5'-di-tert-butylphenyl) benzotriazole(*), 2-(2'-hydroxy-3',5'-di-tert-butylphenyl)-5-chlorobenzotriazole(*), 2-(2'-hydroxy-3'-tert-butyl-5'-methylphenyl) benzotriazole(*), 2-(2'-hydroxy-3'-tert-butyl-5'-methylphenyl)-5-chlorobenzotriazole(*), 2-(2'-hydroxy-3',5'-di-tert-amylphenyl)-5-chlorobenzotriazole(*), 2-(2'-hydroxy-3'-(3",4",5",6"-tetrahydrophthalimide methyl)-5'-methylphenyl)-benzotriazole(*), 2-(5-chloro-2H-benzotriazole-2-yl)-6-tert-butyl-4-methylphenol(*), 2,2'-methylene-bis(4-(1,1,3,3-tetramethylbutyl)-6-(2H-benzotriazole-2-yl) phenol(*), 2-(2'-hydroxy-3',5'-di-tert-pentylphenyl) benzotriazole, 2-(2'-hydroxy-5'-tert-octylphenyl) benzotriazole, 2,2'-methylene-bis(4-tert-octyl-6-benzotriazolyl) phenol(*), 2-(5-butyloxy-2H-benzotriazole-2-yl)-6-tert-butyl-4-methylphenol(*), 2-(5-hexyloxy-2H-benzotriazole-2-yl)-6-tert-butyl-4-methylphenol(*), 2-(5-octyloxy-2H-benzotriazole-2-yl)-6-tert-butyl-4-methylphenol(*), 2-(5-dodecyloxy-2H-benzotriazole-2-yl)-6-tert-butyl-4-methylphenol(*), 2-(5-octadecyloxy-2H-benzotriazole-2-yl)-6-tert-butyl-4-methylphenol(*), 2-(5-cyclohexyloxy-2H-benzotriazole-2-yl)-6-tert-butyl-4-methylphenol(*), 2-(5-propeneoxy-2H-benzotriazole-2-yl)-6-tert-butyl-4-methylphenol(*), 2-(5-(4-methylphenyl)oxy-2H-benzotriazole-2-yl)-6-tert-butyl-4-methylphenol(*), 2-(5-benzyloxy-2H-benzotriazole-2-yl)-6-tert-butyl-4-methylphenol(*), 2-(5-hexyloxy-2H-benzotriazole-2-yl)-4,6-di-tert-butylphenol(*), 2-(5-octyloxy-2H-benzotriazole-2-yl)-4,6-di-tert-butylphenol(*), 2-(5-dodecyloxy-2H-benzotriazole-2-yl)-4,6-di-tert-butylphenol(*), and 2-(5-sec-butyloxy-2H-benzotriazole-2-yl)-4,6-di-tert-butyl phenol(*).

Examples of triazine based ultraviolet light absorbers include, but not limited to, 2-(2-hydroxy-4-hexyloxyphenyl)-4,6-diphenyl-s-triazine, 2-(2-hydroxy-4-propoxy-5-methylphenyl)-4,6-bis(2,4-dimethylphenyl)-s-triazine, 2-(2-hydroxy-4-hexyloxyphenyl)-4,6-dibiphenyl-s-triazine, 2,4-diphenyl-6-(2-hydroxy-4-methoxyphenyl)-s-triazine, 2,4-diphenyl-6-(2-hydroxy-4-ethoxyphenyl)-s-triazine, 2,4-diphenyl-6-(2-hydroxy-4-propoxyphenyl)-s-triazine, 2,4-diphenyl-6-(2-hydroxy-4-butoxyphenyl)-s-triazine, 2,4-bis(2-hydroxy-4-octoxyphenyl)-6-(2,4-dimethylphenyl)-s-triazine, 2,4,6-tris-(2-hydroxy-4-hexyloxy-3-methylphenyl)-s-triazine(*), 2,4,6-tris-(2-hydroxy-4-octoxyphenyl)-s-triazine(*), 2-(4-isooctyloxycarbonyl ethoxyphenyl)-4,6-diphenyl-s-triazine(*), and 2-(4,6-diphenyl-s-triazine-2-yl)-5-(2-(2-ethylhexanoyloxy) ethoxy) phenol.

It is more preferable for an ultraviolet light absorber used for the present invention to have the same skeletal structure as the ultraviolet light absorbers given above in which oxygen atoms are substituted by atoms of sulfur, an element of the same homologous series. Specifically, in the aforementioned ultraviolet light absorbers, ether groups are substituted by thioether groups, hydroxyl groups by mercapto groups, and alkoxy groups by thio groups. It is good to use an ultraviolet light absorber having a sulfur atom-containing substituent group, because such an ultraviolet light absorber is resistant to heat decomposition while kneading it with a thermoplastic resin. In addition, the use of sulfur atoms and appropriately selected alkyl chains serves to lower the melting point by suppressing the intermolecular forces in the ultraviolet light absorber, thereby leading to increased compatibility with thermoplastic resins. An increase in the compatibility with thermoplastic resins serves to maintain a high transparency even if the ultraviolet light absorber is added to a relatively high concentration. In particular, it is most preferable to use a sulfur atom-containing benzotriazole (hereinafter referred to as thiobenzotriazole) based and/or triazine (hereinafter referred to as thiotriazine) based ultraviolet light absorber, which are not only high in compatibility with polyester resin, which is a preferred thermoplastic resin for the laminate film according to embodiments of the present invention, but also high in heat resistance and high in absorptivity.

It is more preferable that an ultraviolet light absorber used for the present invention has a functional group containing a long alkyl chain. A longer alkyl chain acts to decrease intermolecular interaction and suppress the packing of ring structures, and accordingly, this hinders the formation of crystal structures involving a plurality of molecules of the ultraviolet light absorber during heat treatment of the laminate film, thereby preventing the laminate film from undergoing crystallization or whitening after bleed-out. It is preferable for a functional group to contain an alkyl group having a length of 18 or less, more preferably 4 or more and 10 or less, and still more preferably 6 or more and 8 or less. The use of an alkyl chain with a length of 18 or more is not practical because the reaction for synthesizing an ultraviolet light absorber is hindered by steric hindrance, leading to a decrease in the yield of the ultraviolet light absorber.

For a light absorber added for the present invention, the solubility parameter δadd of the light absorber and the solubility parameter δpolym of the thermoplastic resin to which the light absorber is added preferably meet the relation of |δadd−δpolym|≤2.0 to prevent bleed-out. As in the case of the aforementioned SP value between two thermoplastic resins that form a laminate film, it is preferable that the thermoplastic resin and the light absorber has the same level of solubility parameters because this permits easy dispersion of the light absorber when kneading it with the thermoplastic resin and also serves to prevent the occurrence of bleed-out as absorbers form other crystal nuclei rather than mixing with the thermoplastic resin. Hansen's and Hoy's calculation methods are available for prediction of the solubility parameter, but for the present invention, its prediction is performed by using Fedors' prediction method, which permits relatively simple calculation. Fedors' prediction method assumes that the molecular cohesive energy density and molar molecular volume vary depending on the type and number of substituent groups and gives equation (5) for calculation. Here, Ecoh (cal/mol) denotes the cohesive energy and V denotes the molar molecular volume (cm³/mol). The difference in solubility parameter between the light absorber and the thermoplastic resin to which the light absorber is to be added is more preferably 1.5 or less, still more preferably 1.0 or less.

[Mathematical formula 5]

$$\delta = \sqrt{E_{coh}/V} \quad (5)$$

(where $E_{coh}$ denotes the cohesive energy and V denotes the molar molecular volume (cm³/mol).)

For light at an incidence angle of 60°, it is preferable for the transmission spectrum Z from the laminate film according to the present invention preferably to give a transmittance of 20% or less at a wavelength of 390 nm and give a transmittance of 70% or more at a wavelength of 430 nm. In the case where the present laminate film is mounted in a practical device, light does not always come in the perpendicular direction to the film plane, and good cutoff property will be required for light coming in an oblique direction in some cases. The reflection wavelength of light undergoing interference reflection depends on the difference in refractive index between the different thermoplastic resins and the thickness of the film, but in the case of light coming in an oblique direction, the optical path length changes depending on the light refraction that occurs at resin interfaces, resulting in a shift of the reflection wavelength to shorter wavelengths compared to perpendicular incident light. Therefore, even if a sufficient cutoff is realized for perpendicular incident light, a sufficient cutoff may not be realized for incident light coming in the oblique direction. Accordingly, it is preferable that an appropriate ultraviolet light absorber as listed previously is add as required to cover the shift of a reflection wavelength range. For light at an incidence angle of 60°, it is preferable for the transmission spectrum Z to give a transmittance of 15% or less, more preferably 10% or less, at a wavelength of 390 nm. Furthermore, the transmittance at a wavelength of 430 nm is preferably 75% or more.

Described below are preferred optical characteristics, other than spectroscopic characteristics, of the laminate film according to embodiments of the present invention.

It is preferable for the laminate film according to embodiments of the present invention to have an in-plane retardation of more than 400 nm and less than 5,000 nm. The retardation referred to herein for the present invention means the product of the difference in refractive index between the in-plane orientation direction and the direction perpendicular to the orientation direction in each thermoplastic resin and the thickness of the film, but in the case of a laminate film such as the one according to embodiments of the present invention, it is difficult to analyze each thermoplastic resin layer separately, and therefore, the retardation of a laminate film is determined by an optical measuring technique. Retardation can be measured by using a commercial retardation measuring apparatus such as the KOBRA series manufactured by Oji Scientific Instruments Co., Ltd. and WPA-micro manufactured by Photonic Lattice, Inc., or by using the Senarmont method. For the present invention, a retardation measuring apparatus (KOBRA-21ADH) manufactured by Oji Scientific Instruments Co., Ltd. is used according to the measuring procedure described later. It is noted that retardation measurements are taken at a wavelength of 590 nm unless specified otherwise. In this measurement, a sample is sandwiched between two polarized light plates that are set so that their polarizing directions are parallel to each other, and the changes in transmitted light intensity is observed as the polarized light plates are rotated, thereby determining the retardation of the measurement sample and the direction in which the refractive index reaches a maximum on the film (i.e. orientation direction).

The spectral shift property characteristic of the laminate film according to embodiments of the present invention can be developed by orienting it strongly in a particular direction, as described previously. Accordingly, a difference in refractive index occurs between the orientation direction and the direction perpendicular to the orientation direction, and this retardation is large compared to the case where the film is stretched in a good balance in the length direction and in the width direction. In the case of a film that shows an in-plane retardation within the aforementioned numeral range, the film generally can suffer iridescent color unevenness and is seen colored depending on the viewing angle when it is combined with a material that transmits only plane polarized light. In the case of a film that is stretched strongly in a particular direction so that the orientation axis shows the specific direction in plane, such as the laminate film according to embodiments of the present invention, the influence of iridescent color unevenness can be decreased largely by combining them in such a manner that the plane of polarization and the orientation direction of the laminate film are parallel to each other. If the in-plane retardation is 400 nm or less, the in-plane refractive index difference may not be sufficiently high due to balanced stretching, low resin crystallinity, etc., possibly leading to poor spectral shift property. If the in-plane retardation is 5000 nm or more, it means that the laminate film is stretched very strongly in a particular direction unless it has a large thickness, and accordingly, the laminate film will be liable to tearing in the stretching direction, possibly leading to difficulty in producing a film sample in the form of a roll. It is preferable for the in-plane retardation to be more than 400 nm and less than 5,000 nm, but the in-plane retardation depends on the thickness of the laminate film, and in view of the fact that thinner optical films are in growing demand in recent years, it is more preferably more than 400 nm and less than 3,000 nm, more preferably in the range of 500 nm or more and 1,500 nm or less.

For the laminate film according to the present invention, the in-plane retardation is determined as the average of three measurements taken at the width-directional center of the film and the midpoints between the width-directional center and the width-directional ends of the film. For the in-plane retardation of the laminate film according to the present invention, furthermore, it is preferable that the difference between the largest and the smallest of the three measurements taken at the width-directional center of the film and the midpoints between the width-directional center and the width-directional ends of the film is 10% or less of the average of the three measurements. In the case of a roll sample, the width direction of a film means the direction, on the film surface, perpendicular to the wind-off direction. In the case of a cut sample, Young's modulus is measured at every 5° as it is rotated and the direction where it gives the largest Young's modulus value is defined as the width direction. It is preferable that the in-plane retardation is uniform in the width direction of a film because even in the case where a large laminate film is mounted in a practical device, position-dependent multilayer interference unevenness and iridescent color unevenness can be reduced and transmission spectral shift property with in-plane uniformity can be realized. It is more preferable for the difference between the largest and the smallest of the three measurements to be 5% or less of the average in-plane retardation to allow the laminate film to have more uniform in-plane retardation in the width direction. To obtain a laminate film to have uniform in-plane retardation in the width direction, it is necessary to maintain uniform refractive index in the width direction during the stretching step in the width direction. In a common biaxially stretched film, however, length-directional curved orientation (bowing) occurs due to a difference in shrinkage force that is attributable to a difference in temperature between the stretching step and the preheat or heat treatment step. Accordingly, the orientation state (refractive index state) will differ between the width-directional center position and the width-directional ends, resulting in a variation in in-plane retardation. Therefore, it is preferable that a stepwise temperature gradient is introduced in the stretching step in order to reduce the length-directional shrinkage force in the stretching step and ensure uniform orientation in the width direction. This acts to reduce the influence of the shrinkage based on Poisson ratio in the length direction that occurs as a result of stretching in the width direction and the influence of the difference in thermal shrinkage force attributable to a temperature difference between the stretching step and the preceding or succeeding preheat and heat treatment steps, thereby ensuring a uniform width-directional difference in refractive index in the stretching step. It is preferable that the temperature gradient is set within the temperature range from the glass transition temperature to the crystallization temperature of the laminate film and that there are two or more temperature gradient steps before reaching the heat treatment temperature.

For the laminate film according to the present invention, furthermore, it is preferable that the orientation angle, measured from the width direction which is defined as 0°, is 15° or less at all three points of the width-directional center of the film and the midpoints between the width-directional center and the width-directional ends of the film. Here, by definition, the orientation angle is the angle of the orientation direction of the film measured from the width direction (direction of width-directional stretching) of the film, which is regarded as reference angle, and it is represented as an absolute value of 0° or more and less than 90°. Specifically, in the aforementioned retardation measuring apparatus (KOBRA-21ADH) manufactured by Oji Scientific Instruments Co., Ltd., a sample is placed in such a manner that the width direction of the film coincides with the angle of 0° defined on the measuring apparatus, and a value of orientation angle thus measured is adopted.

An orientation angle of 15° or less from the width direction of the film is preferred because it ensures a uniform orientation distribution over the entire film plane so that the spectral shift property has a certain degree of effect regardless of the in-plane width-directional position where the film is pasted. This laminate film can be used suitably in displays containing polarizers as described later, and for example, if the laminate film is pasted in such a manner that the transmission/absorption axis of the polarizer is parallel to the orientation axis of the film, this is preferred because, as generally known, it can be expected to serve for reduction in the iridescent color unevenness attributable to the birefringence of the laminate film and the in-plane uniformity of orientation angle allows the effect thereof to extend over a large region in the width direction. If the orientation angle is more than 15° from the width direction, significant iridescent color unevenness will be visible depending on the position, and this is not preferred in the case where a large-size laminate film is mounted in a practical device, because its appearance deteriorates due to such iridescent color unevenness.

For the present invention, furthermore, it is preferable that the unevenness in orientation angle in the width direction of the film is small. Although serving to maintain a uniform in-plane retardation after the stretching step, the aforementioned shrinkage force reduction in the stretching step alone cannot work enough because the state of orientation differs between the width-directional center position and the width-directional ends due to the shrinkage force attributable to a temperature difference between before and after the heat treatment step, in spite of the uniform retardation. Here, preferred methods for reducing the shrinkage force after the stretching step include adopting a lower heat treatment temperature to reduce the length-directional shrinkage force toward the stretching step and lengthening the intermediate distance between the stretching step and the heat treatment step to temporarily provide an identical or lower temperature region (not lower than the glass transition temperature of the thermoplastic resin that is higher in glass transition temperature than the other thermoplastic resin contained in the laminate film and not higher than the stretching temperature) to increase the rigidity of the film. An increase in the rigidity of the film serves to eliminate the influence of the shrinkage based on Poisson ratio in the length direction that occurs in reaction to the stretching in the width direction, thereby leading to reduced bowing. The former technique, i.e. the adoption of a lower heat treatment temperature, however, may lead to a failure in realizing a sufficient degree of crystallization in the heat fixation step, and the thermal shrinkage may increase in return for the uniformity in retardation and orientation angle. It is preferable, furthermore, the laminate film is stretched slightly and maintained in a tension in the heat treatment step while controlling the shrinkage force in the length direction. Thus, shrinkage in the opposite direction (toward the cooling step) is induced by the temperature difference between the heat treatment step and the cooling step and this serves to reduce the bowing toward the stretching step that remains before the heat treatment step, thereby realizing an increased uniformity in the orientation of the laminate film in the width direction.

When the laminate film according to the present invention is examined to measure the thermal shrinkage force in the orientation direction (X direction) of the film and in the direction perpendicular to the orientation direction (Y direction) of the film, it is preferable that the rising-up temperature is 90° C. or higher in both the X direction and the Y direction and that the shrinkage force at 90° C. or higher and 130° C. or lower is 250 µN or less. The thermal shrinkage force referred to herein is measured by a thermomechanical analysis apparatus (TMA) and determined from shrinkage force measurements taken while increasing the temperature continuously from room temperature. The rising-up temperature of a shrinkage force curve is the temperature at which the shrinkage force curve shows a slope of 200 µN/0.1° C. for the first time. In the case where the shrinkage force rising-up temperature is below 90° C., the laminate film tends to undergo thermal shrinkage during the heat treatment step in the product construction process or during long-term thermal evaluation after the product construction process, possibly leading to a change in the reflection wavelength range due to an increase in the thickness of the laminate film or strong curling of the product due to a difference in shrinkage force between the film and the material pasted thereto. Depending on the type of thermoplastic resin, it is preferable for the rising-up temperature to be 95° C. or higher, more preferably 100° C. or higher. In the case where the shrinkage force at 90° C. or higher and 130° C. or lower is more than 250 µN, furthermore, as heat treatment is performed during the step in which the laminate film is joined to another material on a roller conveyor, the product produced by such joining during conveyance can suffer curling due to shrinkage force difference. It is more preferable that the shrinkage force in the laminate film at 90° C. or higher and 130° C. or lower is 150 µN or less, still more preferably 100 µN or less.

Described below are preferred conditions for the laminate film according to the present invention to show high transparency.

For the present invention, the reflection light intensity in the ranges of $0°\leq\theta\leq40°$ and $50°\leq\theta\leq90°$ is measured using a variable angle photometer to obtain a light intensity spectrum plotted on a graph with the angle (°) on the horizontal axis and the reflection light intensity on the vertical axis, and the resulting curve preferably has two or less extremes. A variable angle photometer is an instrument in which the angle of a light receiver is changed continuously to measure the angle dependence of the intensity of light that is reflected by a sample after being emitted from a light source located at a particular position. If the sample has a smooth surface, specular reflection is mainly detected to give a peak of light intensity at an angle of 45°. Under the influence of spread of the light emitted from the light source, the intensity of the detected light increases monotonously from an incidence angle 0° to 45°, whereas the intensity of the detected light decreases monotonously as the incidence angle exceeds 45° and reaches 90°. However, if there are irregularities on the sample surface or segments that cause light diffusion inside the sample, diffusely reflected light is detected at angles other than the specular reflection angle of 45°. If diffuse reflection occurs, therefore, the originally monotonous light intensity spectrum suffers frequent increases and decreases in intensity to give rise to many extremes. If more than two extremes are detected, it means that the light applied to the sample is scattered strongly, but it is preferable for the number of extremes to be as small as possible when high transparency is required such as in the case of the present laminate film. For the present invention, the number of extremes detected in the ranges of $0°\leq\theta\leq40°$ and $50°\leq\theta\leq90°$ is more preferably one or less, still more preferably zero.

Being characterized by having a multi-layered structure to cut off light in a particular wavelength range, the laminate film according to the present invention can be used as films for preventing the contents of containers from light degradation and can be applied to various products including, for example, building materials, automobile parts such as window film, industrial materials such as film for steel plates lamination of signboards and others, light cutoff film for laser surface processing, process film/mold releasing film for photolithographic materials for electronic devices, light cutoff film for reducing adsorbed dye degradation in dye-sensitized solar cells, optical films for various display devices such as smartphones, head-up displays, electronic paper, and digital signage, and other products in the fields of foodstuffs, medical care, and inks. When irradiated with polarized light, in particular, the laminate film according to the present invention can serve for sharp light cutoff while maintaining reduced reflection colors and high transparency and accordingly can be used suitably in parts of display devices, polarized sunglasses, window films, etc., that strongly require transparency.

There are various display devices including liquid crystal image display devices, organic EL display devices, quantum dot display devices, and micro LED display devices that work on different display mechanisms, and these display devices contain a wide variety of films having different functions. For example, liquid crystal image display devices use polarizer protection film in light polarizing plates, retardation film, surface treated film pasted on front faces of display units to add functions, brightness improving film located immediately before backlight units, antireflection film, transparent conductive base film for ITO etc., and ultraviolet protection film for touch-sensitive units. In addition, films used in organic EL display devices include λ/4 retardation film and polarizer protection film for circularly polarizing plate located on the visible side (upper side) of luminescent layer, surface treated film pasted on front faces of display units to add functions, and various optical films incorporated for protecting contents from external light. In particular, in order to allow the laminate film according to the present invention to demonstrate its spectral shift property, it is most preferably located at an appropriate position where the spectral shift property works effectively for light emitted from inside or transmitted into inside and gives weak reflection color tone in natural light coming from outside and reflected back into the front, and it can serve most suitably as polarizer protection film and screen protection film located on the visible side of the light polarizing plate in a liquid crystal display device, organic EL display device, etc., that contain light polarizing plates.

In particular, being characterized by uniform in-plane retardation and uniform orientation angle, the laminate film according to the present invention can be used suitably as screen protection film for a display device having an optical fingerprint recognition unit, in which it is arranged so that the transmission axis direction of the light polarizing plate in the display is parallel to the orientation direction or the direction perpendicular to the orientation direction of the present laminate film. It is preferable to join them so that the axis is in the parallel direction because the characteristics of the polarized light, which is transmitted through the light polarizing plate after being emitted from the fingerprint recognition light source, are maintained after being transmitted through the laminate film, thereby serving to prevent a decrease in the intensity of the light from the fingerprint recognition light source. The fingerprint recognition performance can be improved further by designing the device so that the retardation is equal to an integer multiple of a half-wavelength of the fingerprint recognition light source.

Uses as window film include thermal insulation film (infrared cutoff film) for interior windows in automobiles and buildings and ultraviolet protection film for polyvinyl butyrate interlayers in laminated glass. In addition, it can also be used as dimming film for ultraviolet degradation prevention of particles that can be oriented by voltage application (for example, liquid crystal molecules).

Described next is a preferred production method for the laminate film according to embodiments of the present invention. As a matter of course, it should be understood that the present invention is not construed as being limited thereto.

The thermoplastic resin A and the thermoplastic resin B are prepared in the form of pellets etc. The pellets are dried in hot air or in a vacuum, as required, and supplied to separate extruders. In each extruder, each thermoplastic resin is heated and melted at or above the melting point and sent through a filter etc. to remove foreign objects, modified resin components, etc., while controlling the resin extrusion at a constant rate by a gear pump. These thermoplastic resins are molded by a die into intended shapes and then discharged into a sheet. Then, the sheet discharged from the die is extruded onto a cooling body such as a casting drum to cool it for solidification to produce a cast sheet. In this process, it is preferable that wire type, tape type, needle type, or knife type electrodes are used to maintain close contact to a cooling body such as a casting drum by an electrostatic force to quench it for solidification. It is also preferable to supply air from a slit-type, spot type, or plane type apparatus to maintain close contact to a cooling body such as a casting drum to quench it for solidification, or use nip rolls to maintain close contact to a cooling body to quench it for solidification.

Here, the thermoplastic resin A and the thermoplastic resin B are sent out through separate flow channels using two or more extruders and then fed to a multilayer lamination apparatus before discharging into a sheet. Useful multilayer lamination apparatuses include multimanifold die, feedblock, and static mixer, but in particular, it is preferable to use a feedblock having fine slits to ensure efficient production of a film having a multilayered structure suitable for the present invention. The use of this type of feedblock eliminates the necessity for an extremely large apparatus, serving to prevent foreign objects from being formed as a result of heat degradation and perform high accuracy lamination even when the stack contains an extremely large number of layers. In addition, the uniform lamination in the width direction is also improved dramatically compared with the conventional techniques. Furthermore, with the above apparatus, the thickness of each layer can be controlled by adopting appropriate slit shapes (length and width), which makes it possible to allow the layers to have any desired thicknesses.

In this way, a molten multilayered sheet having an intended layer structure can be formed and introduced to a die to produce a cast film as described above. It is preferable that that the resulting cast sheet is then biaxially stretched in the length direction and the width direction. The stretching may be performed sequentially in the two directions or simultaneously in the two directions. Furthermore, the film may be re-stretched in the length direction and/or in the width direction.

Described first is a case where the film is subjected to sequential biaxial stretching. Here, stretching in the length direction is performed with the aim of developing molecular orientation in the length direction of the sheet, and commonly, it is achieved by using rollers having different circumferential speeds and may be performed in a single stage or in multiple stages using two or more pairs of rollers. The required stretching ratio depends on the type of thermoplastic resin, but commonly it is preferably 2 to 15, and particularly preferably 2 to 7 in the case where either of the thermoplastic resins forming the laminate film is made of polyethylene terephthalate. Furthermore, the stretching temperature is preferably between the glass transition temperature of the thermoplastic resin that is higher in glass transition temperature than the other thermoplastic resin contained in the laminate film and the temperature that is 100° C. above that glass transition temperature. In the case where either of the thermoplastic resins forming the laminate film is made of polyethylene terephthalate, it is particularly preferable that the stretching ratio in the length direction is 2.5 to 3.5 to develop spectral shift property according to the present invention. If it is strongly oriented in the length direction in the stretching step, neck-down will occur in the width direction of the film, which prevents the film from having a sufficiently large width and possibly leads to increased unevenness in thickness and unevenness in transmission spectrum in the length direction and/or in the width direction after stretching in the width direction.

The uniaxially stretched laminated sheet prepared in this way is subjected to surface treatment such as corona treatment, flame treatment, and plasma treatment as required, followed by in-line coating to form an easy adhesion layer having functions such as lubricity, adhesiveness, antistatic property, etc. In the in-line coating step, an easy adhesion layer may formed on either side of the laminate film, or formed on each side of the laminate film simultaneously or sequentially.

The subsequent stretching in the width direction is intended to develop orientation in the width direction of the sheet and commonly performed by using a tenter in which the sheet is conveyed, with both ends held by clips, while being stretched in the width direction. The required stretching ratio depends on the type of thermoplastic resin, but commonly it is preferably 2 to 15, and particularly preferably 2 to 7 when either of the thermoplastic resins forming the laminate film is made of polyethylene terephthalate. Furthermore, the stretching temperature is preferably between the glass transition temperature of the thermoplastic resin that is higher in glass transition temperature than the other thermoplastic resin contained in the laminate film and the temperature that is 120° C. above that glass transition temperature. To develop spectral shift property according to the present invention in the case where either of the thermoplastic resins forming the laminate film is made of polyethylene terephthalate, it is preferable that the aforementioned stretching in the length direction at a preferred ratio is followed by stretching in the width direction at a ratio of 3.5 to 5.5. Strong stretching in the width direction serves to develop uniform spectral shift property, retardation, and orientation over a large area of the film surface.

The laminate film stretched biaxially in this way is then heat-treated in a tenter at a temperature not lower than the stretching temperature and not higher than the melting point. After uniform slow cooling, it is cooled to room temperature and wound up. As required, in order to realize a low orientation angle and allow the sheet to have thermal dimensional stability, relaxation in the length direction and/or in the width direction may be performed in combination during the slow cooling from the heat treatment temperature.

To realize both spectral shift property according to the present invention and high transparency in the case where either of the thermoplastic resins forming the laminate film is made of polyethylene terephthalate, it is preferable that the ratio between the stretching ratio in the width direction and the stretching ratio in the length direction (stretching ratio in the width direction/stretching ratio in the length direction, or stretching ratio in the length direction/stretching ratio in the width direction, whichever is larger than 1) is 1.1 or more and 3.5 or less. If the stretching ratio is 1.1 or less, the difference in refractive index between the orientation direction and the direction perpendicular thereto may not be sufficiently large, possibly leading to a failure in developing spectral shift property and a failure in realizing a high transparency. If the stretching ratio is 3.5 or more, excessively strong spectral shift property may be developed and, although high transparency can be realized, the film may be liable to tearing in one direction, possibly leading to deterioration in film-forming property. To obtain a laminate film having moderate spectral shift property, more preferred durability, and weak reflection colors, it is more preferable for the stretching ratio to be 1.4 or more and 2.0 or less.

Next, described below is a case of simultaneous biaxial stretching. In the case of simultaneous biaxial stretching, the resulting cast sheet may be subjected to surface treatment such as corona treatment, flame treatment, and plasma treatment as required, followed by in-line coating to impart functions such as lubricity, adhesiveness, antistatic property, etc. In the in-line coating step, an easy adhesion layer may be formed on either side of the laminate film, or formed on each side of the laminate film simultaneously or sequentially.

Then, the cast sheet is introduced into a simultaneous biaxial tenter and conveyed with both ends of the sheet held by clips, followed by stretching it in the length direction and the width direction simultaneously and/or in stages. Useful simultaneous biaxial stretching machines include pantagraph type, screw type, drive motor type, and linear motor type ones, of which the use of a drive motor type machine or a linear motor type machine is preferred because the stretching ratio can be controlled as desired and relaxation treatment can be performed at a desired place. The required stretching ratio depends on the type of resin, but commonly it is preferable that the area ratio is 6 to 50. An area ratio of 8 to 30 is particularly preferred in the case where either of the thermoplastic resins forming the laminate film is made of polyethylene terephthalate. To develop a strong in-plane orientation in a particular direction, it is preferable that the stretching ratio in the length direction and that in the width direction differ from each other. The stretching speed in the length direction and that in the width direction may be either the same or different. Furthermore, the stretching temperature is preferably between the glass transition temperature of the thermoplastic resin that is higher in glass transition temperature than the other thermoplastic resin contained in the laminate film and the temperature that is 120° C. above that glass transition temperature.

It is preferable for the sheet stretched biaxially in this way to be successively subjected to heat treatment in the tenter at a temperature not lower the stretching temperature and not higher than the melting point in order to develop planarity and dimensional stability. If such heat treatment is to be performed, it is preferable to carry out instantaneous relaxation treatment immediately before and/or immediately after entering the heat treatment zone in order to suppress the distribution of the main orientation axis around the width direction. After the heat treatment, the sheet is cooled slowly and uniformly, cooled to room temperature, and wound up. As required, relaxation in the length direction and/or in the width direction may be performed in combination during the slow cooling from the heat treatment temperature. Instantaneous relaxation treatment is carried out immediately before and/or immediately after entering the heat treatment zone.

The laminate film prepared in this way is trimmed to a required width in the wind-up machine to provide a roll free of creases attributable to winding. In the wind-up step, both edges of the sheet may be embossed to improve the appearance.

The thickness of the laminate film according to the present invention is not particularly limited, but it is preferably 5 μm or more and 100 μm or less. In view of the recent growing demands for various functional films having reduced thickness and increased flexibility as a high-end product property, it is preferably 40 μm or less, more preferably 25 μm or less. Although there is no specific lower limit, it is necessary for the film to have a certain thickness in order to develop sufficiently good light cutoff property without bleed-out by making combined use of a light absorber and light reflection by a layered structure. Practically, the thickness is preferably 10 μm or more in order to ensure stable roll wind-up property and breakage-free film production.

It is preferable that the layer formed by in-line coating of the outermost face of the laminate film according to the present invention has antistatic property. In the step of conveying a roll of the laminate film, the laminate film tends to be electrified by the friction between the roll and the laminate film and suffer deposition of dust, and accordingly, deflection and creasing of the laminate film may occur, leading to deterioration in wind-up property. Antistatic performance can be represented by the surface resistance, and it is preferably $1.0 \times 10^7 \Omega/\square$ or more and $1.0 \times 10^{13} \Omega/\square$ or less, more preferably $1.0 \times 10^8 \Omega/\square$ or more and $1.0 \times 10^{10} \Omega/\square$ or less, in an environment at 23° C. and 65% RH. If the resistance is less than $1.0 \times 10^7 \Omega/\square$, malfunction due to electric interaction may occur when applied to suitably applicable display devices. If the resistance is more than $1.0 \times 10^{13} \Omega/\square$, this indicates an electric insulation state and poor antistatic property that may lead to a failure in reducing electrostatic generation.

The antistatic agent to be used is not particularly limited, and useful ones include compounds containing a phosphate, sulfonate, alkali sulfonate, or ionized nitrogen atom. It is preferable that the antistatic agent added accounts for 10% by weight or more and 50% by weight or less relative to the total weight of the solid components of the coat film.

In addition, it is preferable that the outermost face of the laminate film according to the present invention is covered by a hard coat layer containing, as primary component, a curable resin that can impart functions such as abrasion resistance, dimensional stability, adhesiveness, and contact improvement. During roll-to-roll conveyance of a laminate film to be mounted in a product, this serves to prevent abrasion of the surface of the laminate film from being caused by friction between the roll and the laminate film. Furthermore, even in the case where resin oligomer components in the laminate film or various additives added to the laminate film are likely to bleed out during high temperature heat treatment, if a hard coat layer is formed on the outermost face, the hard coat layer, which has a high crosslink density, can serve for reducing their separation. The formation of a curable resin layer also works to prevent the film from changing in size during heat treatment, thus serving for prevention of an increase in film thickness due to thermal shrinkage and associated changes in optical characteristics such as transmission spectra of the laminate film.

Since such a hard coat layer can show good characteristics in the present laminate film, it is preferable to coat at least one side of the laminate film to maintain film properties including film size. Such hard coat layers may be formed on both sides of the laminate film, but adhesion between hard coat layers may occur to cause deterioration in slip properties of the film, which can lead to a decrease in the windability of the roll. It is preferable, therefore, to form a hard coat layer only on one side or, when coating both sides, add particles or perform surface roughening treatment, such as atmospheric plasma and vacuum plasma treatment, of at least either side of the hard coat layer to impart slip properties.

Such a hard coat layer may be formed directly on the outermost face of the laminate film, but it is preferable to interpose an in-line coated layer in between. When there is a large difference in refractive index between the hard coat layer and the thermoplastic resin in the outermost layer of the laminate film, the existence of an in-line coated layer is preferred because contact between them can be improved by adjusting its refractive index. It is preferable that the refractive index of the in-line coated layer is between the refractive index of the thermoplastic resin A or the thermoplastic resin B in the laminate film and the refractive index of the curable resin C in the hard coat layer, and it is more preferable that it is a midpoint value between the refractive indices of the two resins (not less than $0.98 \times (\alpha+\beta)/2$ and not more than $1.02 \times (\alpha+\beta)/2$, wherein $\alpha$ denotes the refractive index of the thermoplastic resin A or the thermoplastic resin B and $\beta$ denotes the refractive index of the curable resin C in the hard coat layer). For example, in the case where polyethylene terephthalate is used as the thermoplastic resin in the outermost layer of the laminate film whereas acrylic resin is used as the curable resin, the former has a refractive index of about 1.65 after the stretching step whereas the latter has a refractive index of about 1.50, thus giving a large difference in refractive index and possibly leading to defective contact. Accordingly, it is preferable that the in-line coated layer has a refractive index of 1.50 or more and 1.60 or less, more preferably 1.55 or more and 1.58 or less.

The curable resin used in the hard coat layer is preferably high in transparency and durability, and useful examples include acrylic resin, urethane resin, fluorine based resin, silicon resin, polycarbonate based resin, and vinyl chloride based resin, which may be used singly or as a mixture thereof. From the viewpoint of curability, flexibility, and productivity, the curable resin preferably consists mainly of an active energy ray curable resin such as polyacrylate resin and other acrylic resins. When producing an abrasion resistant film, it is preferable to use thermosetting urethane resin as the curable resin.

Useful active energy rays for the present invention include various electromagnetic waves that can induce polymerization involving acrylic vinyl groups, such as ultraviolet ray, electron beam, and radiations ($\alpha$-ray, $\beta$-ray, $\gamma$-ray, etc.). Practically, ultraviolet ray is preferred because it is easy to use. Useful sources of ultraviolet rays include ultraviolet fluorescent lamp, low pressure mercury lamp, high pressure mercury lamp, ultrahigh pressure mercury lamp, xenon lamp, and carbon arc lamp. When using ultraviolet rays for curing, it is preferable to maintain the oxygen concentration as low as possible in order to prevent oxygen inhibition, and it is more preferable to perform the curing step in a nitrogen atmosphere or in an inert gas atmosphere. The use of electron beam is advantageous because it is not necessary to add a photopolymerization initiator or light sensitization agent although it requires expensive equipment and operation in an inert gas environment.

The present invention will be illustrated below with reference to examples, but the invention is not limited thereto. The methods used to determine various characteristics are as follows.

(Methods for Measurement of Characteristics and Methods for Evaluation of Effects)

The methods for measurement of characteristics and methods for evaluation of effects used for the present invention are as described below.

(1) Layer Thickness, Number of Stacked Layers, and Lamination Structure

The layer constitution of a laminate film was determined by preparing a cross-sectional sample with a microtome and observing it by transmission electron microscopy (TEM). More specifically, a transmission electron microscope (H-7100FA, manufactured by Hitachi, Ltd.) was used to observe a cross section of the laminate film under the condition of an accelerating voltage of 75 kV, and a cross-sectional photograph was taken and examined to determine the layer constitution and the thickness of each layer. In some cases, a dyeing technique that uses $RuO_4$, $OsO_4$, etc., was performed to increase the contrast. The layer with the smallest thickness (thinnest layer) of all layers included in an image was identified first, and observation was performed at a magnification of 100,000 when the thinnest layer had a thickness of less than 50 nm, 40,000 when the thinnest layer had a thickness of 50 nm or more and less than 500 nm, or 10,000 when the thinnest layer had a thickness of 500 nm or more, in order to determine the layer thickness, number of stacked layers, and lamination structure.

(2) Measurement of Transmittance and Transmission Spectrum

A 4 cm×4 cm sample was cut out from the width-directional center region of a laminate film and placed in a retardation measuring apparatus (KOBRA-21ADH) manufactured by Oji Scientific Instruments Co., Ltd., in such a manner that the width direction of the film coincides with the angle of 0° defined on this measuring apparatus, followed by applying light with a wavelength of 590 nm at an incidence angle of 0° and measuring and reading the orientation angle. If measurement is impossible because light with a wavelength of 590 nm is reflected by the laminate film, an appropriate wavelength at which reflection does not occur was selected from 480 nm, 550 nm, 630 nm, and 750 nm and used to determine the orientation angle. The direction of the orientation angle thus determined was defined as the direction X, whereas the direction perpendicular thereto was defined as the direction Y. Then, transmission spectrum measurement was performed by using a U-4100 spectrophotometer manufactured by Hitachi High-Tech Science Corporation. The Glan-Taylor polarizing prism (MGTYB20) manufactured by Karl Lambrecht and the integrating sphere attached to the equipment were mounted and set in such a manner that the transmission direction in the Glan-Taylor polarizing prism coincides with the orientation direction (direction X) or the direction perpendicular to the orientation direction (direction Y) to obtain a graph showing the variation in the light transmittance in the wavelength region of 295 nm or more and 905 nm or less, which was measured continuously and represented relative to the reflection by a standard white plate of aluminum oxide (attached to the equipment), which was assumed to be 100%, under the measuring conditions of a scanning speed of 600 nm/min and sampling pitch of 1 nm.

(3) Calculation of 10-Point Average of Transmission Spectrum

For the 1 nm pitch transmission spectrum data obtained in the transmittance measurement described in the above paragraph (2), the average value of the transmittance data at ten points before and after were calculated. (For example, data taken in the range of 295 nm to 304 nm give a calculated average transmittance for 299.5 nm. Then, similar calculations are made up to 905 nm to provide 1 nm pitch data over the range from 299.5 nm to 900.5 nm.) Subsequently, the average of two mutually adjacent measurements was calculated (for example, the average transmittance for 300 nm was calculated from the measurements taken at 299.5 nm and 300.5 nm), followed by repeating the same calculation procedure to provide 10-point average transmittance data over the wavelength range of 300 nm to 900 nm.

(4) Optical Density at Wavelength of 390 nm

From the 10-point average transmittance data (transmission spectrum X) obtained from the transmittance measurement described in the above paragraph (2), the transmittance at a wavelength of 390 nm was read and this transmittance represented in percentage was converted into a decimal and substituted in the equation (4) to calculate the optical density.

(5) Variation Width ($\lambda$max–$\lambda$min)

A strip-shaped sample having a size of 5 cm in the width direction of the film and 3 m in the length direction of the film was cut out from the width-directional center region of the film. Using a U-4100 spectrophotometer manufactured by Hitachi High-Tech Science Corporation, the central portion of the film sample with a width of 5 cm was examined to determine 10-point averaged transmission spectrum data over the wavelength of 300 nm or more and 800 nm or less by the same procedure as described in the paragraph (2). This procedure was repeated at intervals of 10 cm in the length direction to obtain transmission spectrum data at 30 points. After performing a 10-point averaging process on the transmission spectrum of each point, the cutoff wavelength $\lambda$ of each spectrum data was read. The largest and the smallest of the cutoff wavelength $\lambda$ values for the 30 points were used as $\lambda$max and $\lambda$min, respectively, to calculate the variation width ($\lambda$max–$\lambda$min).

(6) Young's Modulus

A strip-shaped portion with a length of 15 cm and a width of 1.5 cm was cut out from the film to be used as a sample for Young's modulus measurement. According to JIS-K7127-1999, measurements were taken at a temperature of 23° C. and a humidity of 65% RH using a robot Tensilon tester RTA (manufactured by Orientec Co., Ltd.). Here, the tension rate used was 300 mm/min. This measurement procedure was repeated while changing the angle relative to the cut-out sample by 5° at a time and the direction where the highest Young's modulus value was obtained was defined as the width direction of the film.

(7) In-Plane Retardation and Orientation Angle

A retardation measuring apparatus (KOBRA-21ADH) manufactured by Oji Scientific Instruments Co., Ltd. was used. A sample with a size of 4 cm in the width direction and 4 cm in the length direction was cut out from a total of three points, namely the width-directional center region of the laminate film and the midpoints between the width-directional center and the width-directional ends. It was placed in the measuring apparatus in such a manner that the width direction of the film coincides with the angle of 0° defined on this apparatus, followed by applying light with a wavelength of 590 nm at an incidence angle of 0° and measuring and reading the retardation and the orientation angle. If measurement is impossible because light with a wavelength of 590 nm is reflected by the laminate film, an appropriate wavelength at which reflection does not occur was selected from 480 nm, 550 nm, 630 nm, and 750 nm and used to take measurements. Regarding the retardation, Cauchy's dispersion equation was used to calculate the retardation at a wavelength of 590 nm.

(8) Variable Angle Photometer

A goniophotometer (GP-200) manufactured by Murakami Color Research Laboratory Co., Ltd. was used. The luminous flux aperture and the light receiving aperture were set to 1 and 3, respectively. The sample was placed at an angle of 45° from the optical path and the light receiving portion was moved over the angle range of 0° to 90° to track the amount of transmitted light, followed by evaluating the number of extremes in the resulting curve plotted with the angle) (° on the horizontal axis and the amount of transmitted light on the vertical axis.

(9) Measurement of Thermal Shrinkage Force

A thermomechanical measuring apparatus (TMA/SS6000) manufactured by Seiko Instruments Inc. was used. Samples having a specimen width of 4 mm and a specimen length of 70 mm in the orientation direction of the film and in the direction perpendicular to the orientation direction of the film were cut out from the width-directional center region. The sample was fixed between the clips of the apparatus by fixing the sample to one end of a clip having a distance between chucks of 20 mm and fixing the clip at the other end with a load of 3 g applied. As the sample was heated up from 25° C. (room temperature) to 160° C. at a heating rate of 10° C./min, the shrinkage force was tracked continuously with the sample length maintained constant to determine the rising-up temperature (° C.) and the shrinkage force (UN) in the range of 90° C. or higher and lower than 130° C.

(10) Measurement of Surface Resistance

An R8340 digital ultra-high resistance/subpico ammeter electrometer manufactured by Advantest Corporation was used. Three 10 cm×10 cm samples were cut out from the width-directional center region and used as test pieces. After performing moisture conditioning for 24 hours at 23° C. and 65% RH, a test piece was set in the resistivity chamber (12702 A) and pushed down to the position of 3 on the scale to press the sample against the electrode, followed by measuring the surface resistance. This procedure was carried out for the three test pieces and the measurements taken were averaged.

(11) DSC Measurement

An EXSTAR DSC6220 differential scanning calorimeter manufactured by Seiko Instruments and Electronics Co. Ltd. was used. Measuring and temperature reading were performed according to JIS-K-7122 (1987). A 10 mg specimen was put on an aluminum pan, heated up from 25° C. to 300° C. at a rate of 10° C./min, quenched, and heated up again from 25° C. to 300° C. at a rate of 10° C./min. The temperature at the intersection between the baseline measured by heating from room temperature and the tangent line to the inflection point in the stepwise transition region was adopted as glass transition temperature, and the temperature at the top of the exothermic peak was adopted as crystallization temperature.

(12) Hard Coat Layer Lamination

A laminate film covered by an easy adhesion layer was used as a base, and it was coated using a continuous coating machine equipped with a die coater unit. Shiko UV-1700B [refractive index 1.50 to 1.51] manufactured by Nippon Synthetic Chemical Industry Co., Ltd., which is an ultraviolet curable urethane acrylic resin, was used as the resin material to form the hard coat layer. The die coater unit contained a coating step, drying steps 1 to 3, and curing step. In the coating step, the laminate film is conveyed continuously at a predetermined conveyance speed and coated continuously to a constant thickness in the die coater unit. In the coating step, the conveyance speed was controlled so that the resulting hard coat layer would have a coat thickness (thickness of the solid layer after drying) of 3 μm. The drying steps have a total of three chambers equipped with nozzles for supplying hot air in the parallel direction to the laminate film conveyance direction and far-infrared heaters. In each drying step, the temperature and the hot air supply speed (rotating speed of fan) can be set independently and they are the same on the hard coat side of the laminate film and on the opposite side thereto. The temperature was set to 80° C. in each drying step. To represent the actual temperature of the hot air, a value measured by a sensor attached to the die coater unit was used. The curing step, which was carried out following the drying steps 1 to 3, had a UV emission unit to perform curing in a nitrogen atmosphere (oxygen concentration 0.1 vol % or less) under the conditions of an integrated light quantity of 200 mJ/cm$^2$ and an irradiation light intensity of 160 W/cm.

(13) Bleed-Out Property (Haze Evaluation)

A laminate film is prepared and a test piece having a size of 10 cm in the length direction and 10 cm in the width direction was cut out from the width-directional center region, sandwiched between pieces of plain paper, and left to stand in a windless furnace type oven at 85° C. for 500 hours, followed by determining the change in the haze value of the laminate film before and after the heat treatment step. Haze measurements were taken according to the former JIS-K-7105 (1981) using a haze meter (HGM-2DP) manufactured by Suga Test Instruments Co., Ltd. Measurements were taken from randomly selected five positions on the plane of the laminate film and their average was adopted to represent them.

S: Change in haze value is less than 0.5%.
A: Change in haze value is 0.5% or more and less than 1.0%.
B: Change in haze value is 1.0% or more and less than 1.5%.
C: Change in haze value is 1.5% or more.

(14) Implementation Evaluation (14-1) Mounting of Laminate Film in Practical Device An iPhone (registered trademark) 6 mobile phone manufactured by Apple Inc. was used. The liquid crystal panel was removed to find the light polarizing plate located on the outermost visible side and the laminate film was pasted to the visible surface, with an optical clear adhesive (OCA) layer in between, in such a manner that the transmission axis direction of the light polarizing plate coincides with the orientation direction of the laminate film. The light polarizing plate covered by a laminate film was mounted back in the body of iPhone (registered trademark) 6 to provide a test piece for accelerated weathering test.

(14-2) Color Tone Evaluation of Color Tone Before and After Mounting

A CM-3600d spectrophotometric colorimeter manufactured by Konica Minolta Sensing, Inc. was used to measure the colorimetric value of reflected light on a black background. The change in reflection color tone that occurred between before and after mounting the laminate film according to the present invention in a display device was evaluated. Measurement was performed under the conditions of a measuring diameter of 8 mm, a viewing angle of 10°, and a light source of D65 to determine the a* value and b* value of reflected light (SCI). The degree of change in color tone was evaluated according to the change in color value calculated by the equation (6).

$$\text{Change in color tone} = \{\sqrt{(a^*\text{after test} - a^*\text{before test})^2 + (b^*\text{after test} - b^*\text{before test})^2}\} \quad \text{Equation (6)}$$

S: Change in color tone between before and after accelerated weathering test is less than 2.
A: Change in color tone between before and after accelerated weathering test is 2 or more and less than 5.
B: Change in color tone between before and after accelerated weathering test is 5 or more and less than 10.
C: Change in color tone between before and after accelerated weathering test is 10 or more.

(15) Accelerated Weathering Test (15-1) Accelerated Weathering Test

A display device containing a laminate film is placed in a Sunshine Weather-O-Meter SS80 tester manufactured by Suga Test Instruments Co., Ltd. in such a manner that the visible side faces the incident light and subjected to accelerated weathering test for 500 hours. This tester gives a spectrum similar to sunlight with a threefold intensity and serves for test that simulates long-term outdoor use. The test conditions included a tank temperature of 60° C., a tank humidity of 50% RH, an illuminance of 180 W/m$^2$, and omission of shower.

(15-2) Mounting in Display Device and Contrast (Brightness) Evaluation

Measurement was performed using a BM7 brightness measuring apparatus manufactured by Topcon Technohouse Corporation. Contrast was calculated by the equation (7) where A denotes the brightness on a full white screen and B denotes the brightness on a full black screen. Quality evaluation was performed according to the following criterion based on a change in contrast measured before and after accelerated weathering test.

$$\text{Contrast} = B/A \quad \text{Equation (7)}$$

S: Change in contrast between before and after accelerated weathering test is less than 3%.
A: Change in contrast between before and after accelerated weathering test is 3% or more and less than 5%.
B: Change in contrast between before and after accelerated weathering test is 5% or more and less than 10%.

C: Change in contrast between before and after accelerated weathering test is 10% or more.

(15-3) Mounting in Display Device and Color Tone Evaluation

A CM-3600d spectrophotometric colorimeter manufactured by Konica Minolta Sensing, Inc. was used to measure the colorimetric value of reflected light on a black background. Evaluation was performed based on the change in reflection color tone between before and after accelerated weathering test. Measurement was performed under the conditions of a measuring diameter of 8 mm, a viewing angle of 10°, and a light source of D65 to determine the a* value and b* value of reflected light (SCI). Quality evaluation in color tone was performed based on the change in color value calculated by the equation (6) given above.

S: Change in color tone between before and after accelerated weathering test is less than 2.
A: Change in color tone between before and after accelerated weathering test is 2 or more and less than 5.
B: Change in color tone between before and after accelerated weathering test is 5 or more and less than 10.
C: Change in color tone between before and after accelerated weathering test is 10 or more.

EXAMPLES

Comparative Example 8

Polyethylene terephthalate (PET) resin with a refractive index of 1.58 and a melting point of 255° C. was used as the thermoplastic resin A. On the other hand, a polyethylene terephthalate (PET/CHDM30) copolymerized with cyclohexanedimethanol (CHDM), which was a microcrystalline resin with a refractive index of 1.57 and accounted for 30 mol % relative to the diol component, was used as the thermoplastic resin B. The thermoplastic resin A and the thermoplastic resin B (copolymer resin) prepared above in the form of pellets were fed separately to two twin screw extruders and they were both melted at 280° C. and kneaded. Kneading was performed under the condition of a discharge ratio of 0.7 to the screw rotation speed. Then, they were filtered separately through seven FSS type leaf disk filters and, while weighing by gear pumps, combined in a feedblock with 501 slits to produce a laminated body consisting of 501 layers that were alternately stacked in the thickness direction with a lamination ratio 1.0. Here, the slits were designed so that they had stepwise lengths and were located at regular slit intervals. Transmission electron microscope observation of the resulting alternately laminate film showed that the final laminate film had two outermost layers of the thermoplastic resin A, each having a layer thickness of 3 μm, and the other interior layers having thicknesses in the range of 50 nm or more and 80 nm or less and that it consisted of 251 A-layers, which contained the thermoplastic resin A as primary component, and 250 B-layer, which contained the thermoplastic resin B as primary component, alternately stacked in the thickness direction. Furthermore, the layer thickness had a two-step inclined structure in which the thickness increased monotonously from one outermost layer toward the through-thickness center and decreased monotonously from the through-thickness center toward the other outermost layer. The alternately laminated body was introduced to a T-die, molded into a sheet, and, while applying an electrostatic voltage of 8 kV through a wire, quenched for solidification on a casting drum having a surface temperature maintained at 25° C. to produce an unstretched laminated cast sheet.

The resulting laminated cast sheet was heated on a group of rollers set at 90° C. and then stretched to 3.0 times in the length direction of the film while heating up rapidly in the stretching zone with a length of 100 mm where heat was applied by a radiation heater to both surfaces of the film and then cooled once. Subsequently, both surfaces of this uniaxially stretched laminate film were subjected to corona discharge treatment in air to adjust the surface wetting tension of the base film to 55 mN/m, and easy adhesion layers were formed on both of the treated surfaces of the film by coating them using a #4 spiral-wired metal bar with a vinyl acetate-acrylate resin based aqueous coating material containing 3 wt % of colloidal silica with a particle diameter 100 nm to form a slippery layer (hereinafter "coating" means this procedure). This uniaxially laminate film was introduced to a tenter, where it was preheated in hot air at 90° C. and then stretched to 3.5 times in the width direction of the film at a temperature of 140° C. Immediately after the stretching step, the stretched film was heat-treated in hot air at 230° C. in the tenter, relaxed by 1% in the width direction under the same temperature condition, and wound up to provide a laminate film. The laminate film had a thickness of 35 μm and TEM observation showed that both easy adhesion layers had a thickness of about 60 nm. Furthermore, the transmission spectrum observed by a spectrophotometer rose up in the wavelength range of 370 to 410 nm, showing that the film had long wavelength ultraviolet cutoff property. Basic performance features including retardation are given in Table 1, indicating that bleed-out property evaluation showed a favorable change in haze value of 0.6%.

Evaluation of the film mounted in a display device confirmed that it showed good performance in a practical device although its cutoff property was slightly insufficient in the ultraviolet region because cutoffs in the ultraviolet and long wavelength ultraviolet regions were achieved only by means of light reflection.

Comparative Example 9

Except that, unlike Comparative Example 8, a polyethylene terephthalate copolymer (PET/SPG15/CHDC20), in the form of an amorphous resin with no melting point and with a refractive index of 1.55, containing cyclohexanedicarboxylic acid (CHDC) which accounted for 20 mol % relative to the dicarboxylic acid component, and spiroglycol (SPG), which accounted for 15 mol % relative to the diol component, was used as the thermoplastic resin B and that the extrusion temperature of the thermoplastic resin B was set at 260° C., the same procedure as in Example 1 was carried out to produce a laminate film. Compared to Example 1, the film had a higher reflectance due to a larger refractive index difference and the area of the largest region that shows spectral shift property has increased. Because the film was formed of an amorphous resin, the in-plane retardation was smaller and the orientation angle at width-directional positions was slightly smaller although not sufficiently. Also in the implementation evaluation in a practical device, ultraviolet cutoff property was enhanced and this served to suppress the deterioration in contrast in the brightness evaluation compared to Comparative Example 8 1 (Table 1).

Comparative Example 10

Except that, unlike Comparative Example 9, the laminate film had a total thickness of 72 μm and that benzotriazole based ultraviolet absorber (2,2'-methylene-bis(4-(1,1,3,3-tetramethylbutyl)-6-(2H-benzotriazole-2-yl) phenol) was added so that it accounted for 3 wt % relative to the resin composition present in the B-layer, which contained the thermoplastic resin B as primary component, the same procedure as in Example 2 was carried out to produce a laminate film. Being targeted at the boundary between the red visible region and the near infrared region, the resulting laminate film was highly transparent and able to effectively cut off high energy near infrared light (Table 1).

Comparative Example 1

Unlike Comparative Example 8, a polyethylene terephthalate (PET) resin with a refractive index of 1.58 and a melting point of 258° C. was used as both the thermoplastic resin A and the thermoplastic resin B to produce a single layer film. It had no ultraviolet cutoff property at all and, because of having a single layer film structure, it showed notable deterioration in the bleed-out test and the accelerated weathering test after implementation in a practical device (Table 5).

Comparative Example 11

Except that, unlike Comparative Example 9, benzotriazole based ultraviolet absorber (2,2'-methylene-bis(4-(1,1,3,3-tetramethylbutyl)-6-(2H-benzotriazole-2-yl) phenol) was added to the thermoplastic resin B so that it accounted for 2 wt % relative to the resin composition present in the B-layer, which contained the thermoplastic resin B as primary component, the same procedure as in Comparative Example 9 was carried out to produce a laminate film. The combined effect of light absorption and light reflection served to achieve sufficient ultraviolet cutoff performance. On the other hand, the use of an ultraviolet absorber that was low in compatibility with the resin lead to worse bleed-out property than that of Comparative Example 9 (Table 1).

Comparative Example 2

Except that a polyethylene terephthalate resin containing a benzotriazole based ultraviolet absorber (2,2'-methylene-bis(4-(1,1,3,3-tetramethylbutyl)-6-(2H-benzotriazole-2-yl) phenol) that accounted for 4 wt % relative to the resin composition was used as the thermoplastic resin A and the thermoplastic resin B, the same procedure as in Comparative example 1 was carried out to produce a film. In the case of a common single layer film containing an ultraviolet absorber, long wavelength cutoffs cannot be achieved by light reflection and it is necessary to add an ultraviolet absorber to a high concentration. Accordingly, the film suffered considerable bleed-out and failed to show a performance good enough for long term use (Table 5).

Comparative Example 3

Except that a polyethylene terephthalate resin containing a thiobenzotriazole based ultraviolet absorber (2-(5-dodecylthio-2H-benzotriazole-2-yl)-6-tert-butyl-4-methylphenol) that accounted for 1.5 wt % relative to the resin composition was used as the thermoplastic resin A and the thermoplastic resin B, the same procedure as in Comparative example 1 was carried out to produce a film. It had good long wavelength ultraviolet cutoff property because of containing an ultraviolet absorber having long wavelength ultraviolet cutoff property, but it failed to develop required cutoff property in the ultraviolet region, resulting in degradation after durability test (Table 5).

Comparative Example 4

Except that the ultraviolet absorber adopted was the same thiobenzotriazole based ultraviolet absorber as in Comparative example 3 and was added so that it accounted for 3 wt % relative to the resin composition, the same procedure as in Comparative example 1 was carried out to produce a film. Although the light absorber was added to a high concentration to meet the requirement for ultraviolet regions, the film was slightly poor in bleed-out control property and failed to achieve sharp cutoffs in the long wavelength ultraviolet region. The entire surface of the resulting laminate film became yellowish and the film suffered significant coloring on the screen (Table 5).

Comparative Example 5

Except that, unlike Comparative Example 11, the stretching ratio in the length direction and the stretching ratio in the width direction were set at 3.3 and 3.5, respectively, and that the casting drum speed was decreased depending on the stretching ratio so that the resulting laminate film had a thickness of 35 μm, the same procedure as in Example 4 was carried out to produce a laminate film. The difference in stretching intensity between the two mutually perpendicular directions was so small that the film hardly showed spectrum shifts. Although the shape of the average transmission spectrum Z was similar to that in Comparative Example 11, visible light was reflected back into the front, resulting in a laminate film that caused strong coloring on the display screen (Table 5).

Comparative Example 6

Except that, unlike Comparative Example 11, the casting drum speed was increased so that the resulting laminate film had a thickness of 34 μm, the same procedure as in Example 4 was carried out to produce a laminate film. The reflection wavelength range was overlapped the absorption wavelength range attributed to the ultraviolet absorber added, and spectral shift property hardly developed. Light was not cut off sufficiently in the ultraviolet to HEV region, resulting in a laminate film with poor durability (Table 5).

Example 5

This Example was the same as Example 4 except that a feedblock having 51 slits was used to combine the resin flows to produce a laminate film containing 51 layers alternately stacked in the thickness direction with a lamination ratio of 1.0. Furthermore, the uniaxially stretched laminate film was introduced to a tenter, where it was stretched to 5.0 times in the width direction of the film at a temperature of 140° C. Except that the final film was designed to have a film thickness of 10 μm and consist of two outermost layers each having a thickness of 3 μm and 49 intermediate layers having thicknesses of 50 nm or more and 70 nm or less and forming a single step gradient structure in which their thickness increased monotonously from one side to the other side, the same procedure as in Example 4 was carried out to produce a laminate film. Because of the small number of stacked layers and a fair level of light reflectance and bleed-out prevention property, the film barely showed required performance (Table 1).

Example 6

This Example was the same as Example 4 except that a feedblock having 201 slits was used to combine the resin flows to produce a laminate film containing 201 layers alternately stacked in the thickness direction with a lamination ratio of 1.0. Also except that the uniaxially stretched laminate film was introduced to a tenter, where it was stretched to 4.5 times in the width direction of the film at a temperature of 140° C., the same procedure as in Example 4 was carried out to produce a laminate film. The resulting laminate film had a film thickness of 14 µm and consisted of two outermost layers each having a thickness of 100 µm and 199 intermediate layers having thicknesses of 60 to 80 nm and forming a single step gradient structure. The single step gradient structure served to achieve sharper cutoffs of transmitted light than in Example 4.

Comparative Example 12

This Example was the same as Comparative Example 11 except that a feedblock having 801 slits was used to combine the two different thermoplastic resins to produce a laminate film containing 801 layers alternately stacked in the thickness direction with a lamination ratio of 1.0. Also except that it was designed to have a film thickness of 55 µm and consist of two outermost layers each having a thickness of 3 µm and 799 intermediate layers having thicknesses of 50 to 80 nm, the same procedure as in Comparative Example 11 was carried out to produce a laminate film. The layer thickness increased monotonously from one side to a depth equal to ⅓ of the film thickness, decreased monotonously from the depth equal to ⅓ of the thickness to a depth equal to ⅔ of the thickness, and increased monotonously again from the depth equal to ⅔ of the thickness to the other side, thus forming a three step gradient structure. Because of the large number of layers and a high reflectance due to the three step gradient structure, the film, as compared to Comparative Example 11, underwent the same level of change in color tone between before and after mounting in a practical device although it had good bleed-out prevention property and high long term durability (Table 2).

Example 8

Except that, unlike Comparative Example 11, the uniaxially stretched laminate film was introduced to a tenter, where it was stretched to 5.0 times in the width direction of the film at a temperature of 140° C., the same procedure as in Example 4 was carried out to produce a laminate film. The spectral shift property improved, leading to a lower degree of coloring after mounting in a practical device (Table 2).

Example 9

Except that, unlike Comparative Example 11, the uniaxially stretched laminate film was introduced to a tenter, where it was stretched to 6.0 times in the width direction of the film at a temperature of 140° C., and that the casting drum speed was adjusted to ensure a thickness to 34.5 µm, the same procedure as in Comparative Example 11 was carried out to produce a laminate film. In a polarized state (under X-wave irradiation condition), blue light was blocked strongly, whereas as a whole, blue color reflection is reduced, allowing the laminate film to have properties that meet the concept of spectral shift property (Table 2).

Example 10

Except that, unlike Comparative Example 11, stretching in the length direction was omitted whereas the film was stretched to 3.0 times in the width direction of the film at a temperature of 140° C. and that the casting drum speed was increased depending on the stretching ratio to ensure a thickness of 35 µm, the same procedure as in Comparative Example 11 was carried out to produce a laminate film. As a result of stretching only in one direction, the laminate film had strong reflection cutoff property only in the orientation direction, thereby meeting the concept of low reflection colors, high transparency, and sharp cutoff property (Table 2).

Comparative Example 7

Except that, unlike Comparative Example 11, stretching in the length direction was omitted whereas the film was stretched to 5.0 times in the width direction of the film at a temperature of 140° C. and that the casting drum speed was increased depending on the stretching ratio to ensure a thickness of 35 µm, the same procedure as in Comparative Example 11 was carried out to produce a laminate film. Considerable tearing occurred in the width direction, making it difficult to perform continuous film production. Having excessively strong spectral shift property, the resulting film suffered significant reflection color unevenness and iridescent color unevenness due to uneven stretching and had decreased transparency (Table 5).

Example 11

Except that, unlike Comparative Example 12, the uniaxially stretched laminate film was introduced to a tenter, where it was stretched to 5.0 times in the width direction of the film at a temperature of 140° C., and that the casting drum speed was adjusted to ensure a thickness to 55 µm, the same procedure as in Comparative Example 12 was carried out to produce a laminate film. As in Example 8, the film had improved spectral shift property, leading to a lower degree of coloring after mounting in a practical device (Table 2).

Example 12

Two laminate films as produced in Example 11 were combined, with a monolayer optical sticking film interposed in between, in such a manner that their orientation directions coincided with each other to produce a laminated article. The resulting laminated article showed a retardation twice as large as that in Example 11 and had a thickness of about 115 µm. Because the number of stacked layers was doubled, the reflectance increased and the light cutoff property improved as a whole. The spectral shift property was at the same level as in Example 11, and accordingly the improvement in cutoff property lead to slightly stronger yellow coloring of the transmitted light as a whole (Table 2).

Example 13

Except that, unlike Example 8, the film was stretched to 2.8 times in the length direction and 4.5 times in the width direction and that the casting speed was increased to about 1.2 times so that the thickness was about the same as in Example 8, the same procedure as in Example 8 was carried out to produce a laminate film. In Example 8, the film was stretched to a high ratio in the length direction, and the uniaxially stretched film had a large fluctuation in width when strongly stretched in the width direction, resulting in uneven stretching in the length direction of the film and associated significantly uneven cutoff wavelengths. Here, the stretching ratio in the length direction was decreased to reduce the fluctuation in width of the film, and further it was possible to develop as good spectral shift property as in Example 8 (Table 3).

Example 14

This Example is the same as Example 13 except that a polyethylene terephthalate copolymer (PET/SPG21/CHDC4), in the form of an amorphous resin with no melting point and with a refractive index of 1.55, containing cyclohexanedicarboxylic acid (CHDC), which accounted for 4 mol % relative to the dicarboxylic acid component, and spiroglycol (SPG), which accounted for 21 mol % relative to the diol component, was used as the thermoplastic resin B and that the extrusion temperature of the thermoplastic resin B was set at 260° C. In addition, the preheat temperature in each stretching step was set at 105° C., and except for these, the same procedure as in Example 13 was carried out to produce a laminate film. As a result of a change in the constitution of the thermoplastic resin B, the laminate film slightly whitened and extremes due to diffusion reflection appeared in variable angle photometry observation. On the other hand, as a result of an improved glass transition temperature of the thermoplastic resin and an increased heat shrinkage resistance of the resulting laminate film, a decrease in contrast change in accelerated weathering test was achieved and the overall change in brightness was at the same level as in Example 13 (Table 3).

Example 15

Except that the kneading conditions for the thermoplastic resin B used in Example 14 were changed so that the discharge rate relative to the screw rotation speed was 0.3, the same procedure as in Example 14 was carried out to produce a laminate film. As a result of stronger kneading, whitening seen in Example 14 disappeared and no extremes occurred in variable angle photometry observation. Accordingly, a noticeable decrease in contrast change in accelerated weathering test was achieved and the film gave the best results in this evaluation (Table 3).

Example 16

Except that, unlike Example 15, a triazine based ultraviolet absorber (2,4,6-tris-(2-hydroxy-4-hexyloxy-3-methylphenyl)-s-triazine) was added to the thermoplastic resin B so that it accounted for 1.5 wt % relative to the resin composition present in the laminate film, the same procedure as in Example 15 was carried out to produce a laminate film. This ultraviolet absorber was better in terms of long wavelength cutoff property than the benzotriazole based ones used above and high in compatibility with polyethylene terephthalate resin and served to give the best results in both the bleed-out prevention property evaluation and the accelerated weathering test (Table 3).

Example 17

Except that, unlike Example 15, a triazine based ultraviolet absorber (2,4-bis(2-hydroxy-4-butyloxyphenyl)-6-(2,4-bis-butyloxyphenyl)-s-triazine) was added to the thermoplastic resin B so that it accounted for 1.5 wt % relative to the resin composition present in the laminate film, the same procedure as in Example 15 was carried out to produce a laminate film. The film had long wavelength cutoff property and, although being relatively low in absorption intensity and giving inferior results as compared to Example 16, it was sufficiently high in resistance to long term use (Table 3).

Example 18

Except that, unlike Example 15, the thiobenzotriazole based ultraviolet absorber adopted in Comparative example 3 was added so that it accounted for 1.0 wt % relative to the resin composition present in the laminate film, the same procedure as in Example 15 was carried out to produce a laminate film. The amount of the ultraviolet absorber added was small and a synergy effect of reflection and absorption was realized in the long wavelength ultraviolet region, leading to high durability and good spectral shift property (Table 3).

Example 19

Except that, unlike Example 16, two-stage stretching at temperatures of 110° C. and 140° C. was performed in the width-directional stretching step, the same heat treatment step as in Example 16 was carried out to produce a laminate film. As a result of decreased length-directional shrinkage during two-stage heating in the stretching step, it was possible to obtain a uniform retardation in the width direction as compared to Example 16 (Table 4).

Example 20

Except that, unlike Example 19, the heat treatment temperature was lowered from 230° C. to 180° C., the same procedure as in Example 19 was carried out to produce a laminate film. The decrease in the heat treatment temperature served to realize a shrinkage force balance in the length direction of the laminate film to reduce the bowing phenomenon, leading to width-directional orientation angle uniformity. On the other hand, a lack of heat fixation leads to an improved shrinkage force (Table 4).

Example 21

Except that, unlike Example 20, an intermediate region where the film width was maintained constant at 140° C. was provided after the stretching step for the width-directional stretching, the same procedure as in Example 20 was carried out to produce a laminate film. The existence of a high-rigidity, constant-temperature intermediate region to separate the stretching step from the heat treatment step worked to further reduce the shrinkage force in the length direction of the laminate film, thus serving effectively to achieve width-directional orientation angle uniformity (Table 4).

Example 22

Except that, unlike Example 21, a 10% stretching was performed in the heat treatment step, the same procedure as in Example 21 was carried out to produce a laminate film. The stretching performed in the heat treatment step served to produce a laminate film that showed the highest retardation uniformity and orientation angle uniformity among all Examples given above (Table 4).

Example 23

A hard coat layer was formed on one outermost surface of the laminate film produced in Example 22. The addition of a high-rigidity hard coat layer worked to largely reduce the heat shrinkage force, leading to a laminate film showing no change after accelerated weathering test (Table 4).

Example 24

Except that, unlike Example 23, a polyethylene terephthalate copolymer (PET/SPG30), in the form of an amorphous resin with no melting point and with a refractive index of 1.55, containing spiroglycol (SPG), which accounted for 30 mol %, was used as the thermoplastic resin B and that the extrusion temperature of the thermoplastic resin B was set at 260° C., the same procedure as in Example 23 was carried out to produce a laminate film. The use of only SPG, which is a non-oriented component, as copolymerization component, served to enhance the dimensional stability, leading to a laminate film still higher in rigidity than in Example 23 (Table 4).

TABLE 1

|  |  |  | Example 1 | Example 2 | Example 3 | Example 4 | Example 5 | Example 6 |
|---|---|---|---|---|---|---|---|---|
| Number of stacked layers |  | — | 501 | 501 | 501 | 501 | 51 | 201 |
| Copolymerization component | composition | — | cyclohexane-dimethanol | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid |
|  | amount of copolymerization | mol % | 30 | 15/20 | 15/20 | 15/20 | 15/20 | 15/20 |
| Stretching ratio | length direction (longitudinal stretching) | times | 3.0 | 3.0 | 3.0 | 3.0 | 3.0 | 3.0 |
|  | width direction (transverse stretching) | times | 3.5 | 3.5 | 3.5 | 3.5 | 5.0 | 4.5 |
|  | ratio between width-directional stretching ratio and length-directional stretching ratio | times | 1.2 | 1.2 | 1.2 | 1.2 | 1.7 | 1.5 |
| Area Amax of largest region surrounded by X wave and Y wave | Amax wavelength 300 nm to 900 nm | nm · % | 160 | 280 | 240 | 240 | 180 | 210 |
|  | $Amax_{350\text{-}500}$ wavelength 350 nm to 500 nm | nm · % | 160 | 280 | 0 | 240 | 180 | 210 |
| Optical density at 390 nm | transmission spectrum X | — | 0.8 | 1.2 | 0.09 | 1.6 | 0.6 | 1.3 |
|  | transmission spectrum Z | — | 0.5 | 0.8 | 0.09 | 1 | 0.4 | 0.8 |
| Cutoff wavelength variation width ($\lambda$max − $\lambda$min) |  | nm | 12 | 13 | 15 | 13 | 17 | 12 |
| Transmission spectrum Z 60° incident light transmittance | wavelength 390 nm | % | 78 | 71 | 7 | 15 | 14 | 15 |
|  | wavelength 430 nm | % | 80 | 80 | 79 | 79 | 80 | 80 |
| Retardation | average in-plane retardation | nm | 840 | 500 | 1150 | 500 | 400 | 500 |
|  | (maximum − minimum)/average | % | 11 | 13 | 14 | 12 | 18 | 16 |
| Orientation angle (maximum among 3 posiotions of width-directional center and midpoints between width-directional center and either end) |  | ° | 24 | 18 | 20 | 18 | 12 | 15 |
| Ultraviolet absorber | main skeletal structure | — | — | — | benzotriazole | benzotriazole | benzotriazole | benzotriazole |
|  | content | wt % | — | — | 3 | 2 | 2 | 2 |
|  | number of side chain alkyl groups (longest) | — | — | — | 4 | 4 | 4 | 4 |
|  | solubility parameter $|\delta_{add} - \delta_{polym}|$ | — | — | — | 2.3 | 2.3 | 2.3 | 2.3 |
| Variable angle photometer | number of extremes | number | 0 | 0 | 0 | 0 | 0 | 0 |
| Heat shrinkage force measurement | rising-up temperature | ° C. | 79 | 78 | 78 | 79 | 79 | 79 |
|  | shrinkage force (at 90° C. to 130° C.) | μN | 320 | 290 | 280 | 290 | 260 | 210 |
| Hard coat laminate |  | — | absent | absent | absent | absent | absent | absent |
| Color tone change between before and after mounting in device |  | — | A | B | A | A | A | A |
| Bleed-out prevention propery |  | — | A | A | B | B | B | B |
| Accelerated weathering test | brightness change in device | — | B | A | B | A | B | A |
|  | color tone change in device | — | B | B | A | B | B | B |

TABLE 2

|  |  |  | Example 7 | Example 8 | Example 9 | Example 10 | Example 11 | Example 12 |
|---|---|---|---|---|---|---|---|---|
| Number of stacked layers |  | — | 801 | 501 | 501 | 501 | 801 | 1603 |
| Copolymerization component | composition | — | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid |
|  | amount of copolymerization | mol % | 15/20 | 15/20 | 15/20 | 15/20 | 15/20 | 15/20 |
| Stretching ratio | length direction (longitudinal stretching) | times | 3.0 | 3.0 | 3.0 | 1.0 | 3.0 | 3.0 |
|  | width direction (transverse stretching) | times | 3.5 | 5.0 | 6.0 | 3.0 | 5.0 | 5.0 |
|  | ratio between width-directional stretching ratio and length-directional stretching ratio | times | 1.2 | 1.7 | 2.0 | 3.0 | 1.7 | 1.7 |
| Area Amax of largest region surrounded by X wave and Y wave | Amax wavelength 300 nm to 900 nm | nm · % | 300 | 720 | 1250 | 1,500 | 1,000 | 1,000 |
|  | $Amax_{350\text{-}500}$ wavelength 350 nm to 500 nm | nm · % | 300 | 720 | 1250 | 1,500 | 1,000 | 1,000 |

TABLE 2-continued

|  |  |  | Example 7 | Example 8 | Example 9 | Example 10 | Example 11 | Example 12 |
|---|---|---|---|---|---|---|---|---|
| Optical density at 390 nm | transmission spectrum X | — | 2 | 1.8 | 2.1 | 2 | 2.3 | 2.6 |
|  | transmission spectrum Z | — | 1.3 | 1 | 1 | 1 | 1.2 | 1.5 |
| Cutoff wavelength | variation width (λmax − λmin) | nm | 15 | 20 | 16 | 12 | 19 | 19 |
| Transmission spectrum Z 60° incident light transmittance | wavelength 390 nm | % | 9 | 15 | 14 | 15 | 10 | 10 |
|  | wavelength 430 nm | % | 80 | 80 | 80 | 79 | 79 | 79 |
| Retardation | average in-plane retardation | nm | 500 | 1250 | 1400 | 1,500 | 1800 | 3550 |
|  | (maximum − minimum)/average | % | 15 | 13 | 11 | 9 | 12 | 11 |
| Orientation angle (maximum among 3 posistions of width-directional center and midpoints between width-directional center and either end) |  | ° | 16 | 12 | 10 | 3 | 13 | 13 |
| Ultraviolet absorber | main skeletal structure | — | benzotriazole | benzotriazole | benzotriazole | benzotriazole | benzotriazole | benzotriazole |
|  | content | wt % | 2 | 2 | 2 | 2 | 2 | 2 |
|  | number of side chain alkyl groups (longest) | — | 4 | 4 | 4 | 4 | 4 | 4 |
|  | solubility parameter $|\delta_{add} - \delta_{polym}|$ | — | 2.3 | 2.3 | 2.3 | 2.3 | 2.3 | 2.3 |
| Variable angle photometer | number of extremes | nummber | 0 | 0 | 0 | 0 | 0 | 1 |
| Heat shrinkage force measurement | rising-up temperature | ° C. | 79 | 79 | 80 | 78 | 79 | 79 |
|  | shrinkage force (at 90° C. to 130° C.) | μN | 330 | 280 | 330 | 360 | 340 | 340 |
| Hard coat laminate |  | — | absent | absent | absent | absent | absent | absent |
| Color tone change between before and after mounting in device |  | — | B | A | A | B | A | B |
| Bleed-out prevention propery |  | — | A | B | B | B | A | A |
| Accelerated weathering test | brightness change in device | — | A | A | A | A | A | B |
|  | color tone change in device | — | B | A | A | A | B | B |

TABLE 3

|  |  |  | Example 13 | Example 14 | Example 15 | Example 16 | Example 17 | Example 18 |
|---|---|---|---|---|---|---|---|---|
| Number of stacked layers |  | — | 501 | 501 | 501 | 501 | 501 | 501 |
| Copolymerization component | composition | — | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid |
|  | amount of copolymerization | mol % | 15/20 | 21/4 | 21/4 | 21/4 | 21/4 | 21/4 |
| Stretching ratio | length direction (longitudinal stretching) | times | 2.8 | 2.8 | 2.8 | 2.8 | 2.8 | 2.8 |
|  | width direction (transverse stretching) | times | 4.5 | 4.5 | 4.5 | 4.5 | 4.5 | 4.5 |
|  | ratio between width-directional stretching ratio and length-directional stretching ratio | times | 1.6 | 1.6 | 1.6 | 1.6 | 1.6 | 1.6 |
| Area Amax of largest region surrounded by X wave and Y wave | Amax wavelength 300 nm to 900 nm | nm · % | 700 | 600 | 600 | 550 | 600 | 500 |
|  | Amax$_{350-500}$ wavelength 350 nm to 500 nm | nm · % | 700 | 600 | 600 | 550 | 600 | 500 |
| Optical density at 390 nm | transmission spectrum X | — | 1.8 | 1.8 | 1.8 | 2.4 | 2.1 | 3.2 |
|  | transmission spectrum Z | — | 1 | 1 | 1 | 1.6 | 1.4 | 2 |
| Cutoff wavelength | variation width (λmax − λmin) | nm | 12 | 9 | 10 | 10 | 10 | 10 |
| Transmission spectrum Z 60° incident light transmittance | wavelength 390 nm | % | 15 | 15 | 14 | 10 | 7 | 4 |
|  | wavelength 430 nm | % | 79 | 79 | 79 | 79 | 75 | 74 |
| Retardation | average in-plane retardation | nm | 1200 | 1250 | 1200 | 1200 | 1200 | 1200 |
|  | (maximum − minimum)/average | % | 11 | 12 | 12 | 11 | 12 | 13 |
| Orientation angle (maximum among 3 positions of width-directional center and midpoints between width-directional center and either end) |  | ° | 14 | 13 | 13 | 12 | 13 | 13 |
| Ultraviolet absorber | main skeletal structure | — | benzotriazole | benzotriazole | benzotriazole | triazine | triazine | thiobenzo-triazole |
|  | content | wt % | 2 | 2 | 2 | 1.5 | 1.5 | 1 |
|  | number of side chain alkyl groups (longest) | — | 4 | 4 | 4 | 6 | 4 | 6 |
|  | solubility parameter $|\delta_{add} - \delta_{polym}|$ | — | 2.3 | 2.3 | 2.3 | 0.9 | 1.2 | 0.5 |

TABLE 3-continued

|  |  |  | Example 13 | Example 14 | Example 15 | Example 16 | Example 17 | Example 18 |
|---|---|---|---|---|---|---|---|---|
| Variable angle photometer | number of extremes | nummber | 0 | 2 | 0 | 0 | 0 | 0 |
| Heat shrinkage force measurement | rising-up temperature | °C. | 79 | 91 | 91 | 90 | 90 | 91 |
|  | shrinkage force (at 90° C. to 130° C.) | μN | 280 | 220 | 220 | 220 | 220 | 220 |
| Hard coat laminate |  | — | absent | absent | absent | absent | absent | absent |
| Color tone change between before and after mounting in device |  | — | A | A | A | S | S | S |
| Bleed-out prevention propery |  | — | B | B | B | S | A | S |
| Accelerated weathering test | brightness change in device | — | A | A | S | S | A | S |
|  | color tone change in device | — | A | A | A | A | A | S |

TABLE 4

|  |  |  | Example 19 | Example 20 | Example 21 | Example 22 | Example 23 | Example 24 |
|---|---|---|---|---|---|---|---|---|
| Number of stacked layers |  | — | 501 | 501 | 501 | 501 | 501 | 501 |
| Copolymerization component | composition | — | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid | spiroglycol/cyclohexane-dicarboxylic acid | spiroglycol |
|  | amount of copolymerization | mol % | 21/4 | 21/4 | 21/4 | 21/4 | 21/4 | 30 |
| Stretching ratio | length direction (longitudinal stretching) | times | 2.8 | 2.8 | 2.8 | 2.8 | 2.8 | 2.8 |
|  | width direction (transverse stretching) | times | 4.5 | 4.5 | 4.5 | 4.5 | 4.5 | 4.5 |
|  | ratio between width-directional stretching ratio and length-directional stretching ratio | times | 1.6 | 1.6 | 1.6 | 1.6 | 1.6 | 1.6 |
| Area Amax of largest region surrounded by X wave and Y wave | Amax wavelength 300 nm to 900 nm | nm · % | 550 | 550 | 550 | 550 | 550 | 550 |
|  | $Amax_{350-500}$ wavelength 350 nm to 500 nm | nm · % | 550 | 550 | 550 | 550 | 550 | 550 |
| Optical density at 390 nm | transmission spectrum X | — | 2.3 | 2.3 | 2.3 | 2.4 | 2.4 | 2.3 |
|  | transmission spectrum Z | — | 1.8 | 1.6 | 1.6 | 1.7 | 1.7 | 1.6 |
| Cutoff wavelength variation width (λmax − λmin) |  | nm | 9 | 8 | 8 | 8 | 8 | 8 |
| Transmission spectrum Z | wavelength 390 nm | % | 15 | 15 | 14 | 14 | 14 | 14 |
|  | wavelength 430 nm | % | 80 | 80 | 80 | 80 | 81 | 81 |
| 60° incident light transmittance |  |  |  |  |  |  |  |  |
| Retardation | average in-plane retardation | nm | 1200 | 1150 | 1150 | 1100 | 1100 | 1100 |
|  | (maximum − minimum)/average | % | 7 | 7 | 6 | 5 | 5 | 4 |
| Orientation angle (maximum among 3 posiotions of width-directional center and midpoints between width-directional center and either end) |  | ° | 11 | 9 | 6 | 4 | 4 | 5 |
| Ultraviolet absorber | main skeletal structure | — | triazine | triazine | triazine | triazine | triazine | triazine |
|  | content | wt % | 1.5 | 1.5 | 1.5 | 1.5 | 1.5 | 1.5 |
|  | number of side chain alkyl groups (longest) | — | 6 | 6 | 6 | 6 | 6 | 6 |
|  | solubility parameter $|\delta_{add} - \delta_{polym}|$ | — | 0.9 | 0.9 | 0.9 | 0.9 | 0.9 | 0.9 |
| Variable angle photometer | number of extremes | nummber | 0 | 0 | 0 | 0 | 0 | 0 |
| Heat shrinkage force measurement | rising-up temperature | °C. | 90 | 90 | 91 | 91 | 91 | 97 |
|  | shrinkage force (at 90° C. to 130° C.) | μN | 230 | 280 | 230 | 230 | 140 | 80 |
| Hard coat laminate |  | — | absent | absent | absent | absent | present | present |
| Color tone change between before and after mounting in device |  | — | S | S | S | S | S | S |
| Bleed-out prevention propery |  | — | S | S | S | S | S | S |
| Accelerated weathering test | brightness change in device | — | S | S | S | S | S | S |
|  | Color tone change in device | — | S | B | S | S | S | S |

TABLE 5

| | | | Comparative example 1 | Comparative example 2 | Comparative example 3 | Comparative example 4 | Comparative example 5 | Comparative example 6 | Comparative example 7 |
|---|---|---|---|---|---|---|---|---|---|
| Number of stacked layers | | — | 1 | 1 | 1 | 1 | 501 | 501 | 501 |
| Copolymerization composition component | | — | — | — | — | — | spiroglycol/ cyclohexane-dicarboxylic acid | spiroglycol/ cyclohexane-dicarboxylic acid | spiroglycol/ cyclohexane-dicarboxylic acid |
| | amount of copolymerization | mol % | — | — | — | — | 15/20 | 15/20 | 15/20 |
| Stretching ratio | length direction (longitudinal stretching) | times | 3.0 | 3.0 | 3.0 | 3.0 | 3.3 | 3.0 | 1.0 |
| | width direction (transverse stretching) | times | 3.5 | 3.5 | 3.5 | 3.5 | 3.5 | 3.5 | 5.0 |
| | ratio between width-directional stretching ratio and length-directional stretching ratio | times | 1.2 | 1.2 | 1.2 | 1.2 | 1.1 | 1.2 | 5.0 |
| Area Amax of largest region surrounded by X wave and Y wave | Amax wavelength 300 nm to 900 nm | nm · % | 0 | 0 | 0 | 0 | 60 | 30 | 4000 |
| | $Amax_{350-500}$ wavelength 350 nm to 500 nm | nm · % | 0 | 0 | 0 | 0 | 60 | 30 | 4000 |
| Optical density at 390 nm | transmission spectrum X | — | 0.06 | 0.5 | 1.7 | 2.4 | 1.1 | 0.6 | 2.1 |
| | transmission spectrum Z | — | 0.06 | 0.5 | 1.7 | 2.4 | 1 | 0.5 | 1 |
| Cutoff wavelength variation width ($\lambda$max − $\lambda$min) | | nm | — | — | — | — | 20 | 15 | 8 |
| Transmission spectrum Z | wavelength 390 nm | % | 80 | 18 | 2 | 0 | 15 | 16 | 15 |
| | wavelength 430 nm | % | 80 | 80 | 70 | 59 | 80 | 80 | 80 |
| 60° incident light transmittance | | | | | | | | | |
| Retardation | average in-plane retardation | nm | 2200 | 2100 | 2200 | 2200 | 140 | 450 | 1650 |
| | (maximum − minimum)/ average | % | 15 | 14 | 16 | 10 | 18 | 13 | 8 |
| Orientation angle (maximum among 3 posiostions of width-directional center and midpoints between width-directional center and either end) | | ° | 32 | 30 | 30 | 30 | 36 | 18 | 2 |
| Ultraviolet absorber | main skeletal structure | — | — | benzotriazole | thiobenzotriazole | thiobenzotriazole | benzotriazole | benzotriazole | benzotriazole |
| | content | wt % | — | 4 | 1.5 | 3 | 2 | 2 | 2 |
| | number of side chain alkyl groups (longest) | — | — | 4 | 6 | 6 | 4 | 4 | 4 |
| | solubility parameter $|\delta_{add} - \delta_{polym}|$ | — | — | 2.3 | 0.5 | 0.5 | 2.3 | 2.3 | 2.3 |
| Variable angle photometer | number of extremes | nummber | 0 | 0 | 0 | 0 | 0 | 0 | 0 |
| Heat shrinkage force measurement | rising-up temperature | °C. | 78 | 77 | 77 | 77 | 79 | 79 | 79 |
| | shrinkage force (at 90° C. to 130° C.) | μN | 280 | 280 | 280 | 280 | 290 | 290 | 400 |
| Hard coat laminate | | — | absent | absent | absent | absent | absent | absent | absent |
| Color tone change between before and after mounting in device | | — | S | S | S | A | C | S | C |
| Bleed-out prevention propery | | — | C | C | A | C | B | B | B |
| Accelerated weathering test | brightness change in device | — | C | C | C | C | A | C | A |
| | Color tone change in device | — | A | S | S | S | B | S | A |

Being characterized by having a multi-layered structure to cut off light in a particular wavelength range, the laminate film according to the present invention can be used in a wide variety of products that require ultraviolet cutoffs for preventing the contents of containers from light degradation, including, for example, building materials, automobile parts such as window film, industrial materials such as film for steel plates lamination of signboards and others, light cutoff film for laser surface processing, and also process film/mold releasing film for photolithographic materials for electronic devices, optical films for various display devices, and other products in the fields of foodstuffs, medical care, and inks. In particular, the laminate film shows unique spectral shift property when irradiated with linearly polarized light although not showing long wavelength ultraviolet cutoff property when irradiated with natural light, and accordingly, it is particularly suitable for use in display devices and polarized sunglasses that incorporate polarizers. Being durable to ultraviolet light, it serves more effectively in the fields of products for outdoor use including digital signage and in-car display devices.

EXPLANATION OF NUMERALS

1: transmission spectrum X observed when applying polarized X wave
2: transmission spectrum Y observed when applying polarized Y wave
3: transmission spectrum Z
4: region Amax surrounded by transmission spectrum X and transmission spectrum Y in the wavelength range of 300 nm or more and 900 nm or less
5: minute region between wavelength n [nm] and wavelength n+1 [nm]

6: region Amax surrounded by transmission spectrum X and transmission spectrum Y in the wavelength range of 350 nm or more and 500 nm or less
7: wavelength range where transmittance increases continuously by 20% or more
8: cutoff wavelength λ

The invention claimed is:

1. A laminate film comprising 51 or more layers including layers A each containing a thermoplastic resin A as primary component and layers B each containing a thermoplastic resin B, which is different from the thermoplastic resin A, as primary component that are stacked alternately, and meeting the relation of 150≤Amax≤1,500 wherein Amax (nm·%) represents the area of the largest of the regions surrounded by a transmission spectrum X and a transmission spectrum Y, the transmission spectrum X being a transmission spectrum obtained on a graph with wavelength (nm) on the horizontal axis and transmittance (%) on the vertical axis showing plotted results of observation in which a linearly polarized light (X wave) vibrating in the orientation direction of the film is used for irradiation over the wavelength range of 300 nm or more and 900 nm or less and the transmission spectrum Y being a transmission spectrum obtained on the graph with wavelength (nm) on the horizontal axis and transmittance (%) on the vertical axis showing plotted results of observation in which a linearly polarized light (Y wave) vibrating in the direction perpendicular to the orientation direction of the film is used for irradiation over the wavelength range of 300 nm or more and 900 nm or less, and Amax (nm %) is calculated by Equation (3) where $T'_n$ and $T_n$ are the X wave transmittance and the Y wave transmittance, respectively, at a shorter wavelength (wavelength of n [nm]) and $T'_{n+1}$ and $T_{n+1}$ are the X wave transmittance and the Y wave transmittance, respectively, at a longer wavelength (wavelength of n+1 [nm]), and a and b denote the wavelengths at the intersections of the transmission spectra and meet the relation of 300≤a<b≤900, and an orientation angle, measured from the width direction of the film which is defined as 0° is 15° or less at all three points of the width-directional center of the film and the midpoints between the width-directional center and the width-directional ends according to Mathematical Formula 3:

$$\text{Amax} = \int_a^b \{(T_n - T'_n) + (T_{n+1} - T'_{n+1})\}/2 \, dn \quad (3)$$

(where a and b denote the wavelengths at the intersections of the transmission spectra and meet the relation of 300≤a<b≤900).

2. The laminate film as set forth in claim 1, wherein at least part of the largest of the regions surrounded by the transmission spectrum X and the transmission spectrum Y exists in the wavelength range of 350 nm or more and 500 nm or less, and the area $\text{Amax}_{350-500}$ (nm·%), which represents the λmax in the wavelength range of 350 nm or more and 500 nm or less, meets the relation of $150 \leq \text{Amax}_{350-500} \leq 1,500$.

3. The laminate film as set forth in claim 1, wherein the transmission spectrum Z calculated by averaging the transmission spectrum X and the transmission spectrum Y has an optical density of 1.0 or more at a wavelength of 390 nm.

4. The laminate film as set forth in claim 1, wherein the variation width (λmax−λmin) of the cutoff wavelength λ of the transmission spectrum X in the wavelength range of 350 nm or more and 500 nm or less in the film length direction is 20 nm or less.

5. The laminate film as set forth in claim 1, wherein the transmission spectrum Z of light at an incidence angle of 60° shows a transmittance of 20% or less at a wavelength of 390 nm and a transmittance of 70% or more at a wavelength of 430 nm.

6. The laminate film as set forth in claim 1 containing a benzotriazole based and/or triazine based ultraviolet absorber incorporating a sulfur atom.

7. The laminate film as set forth in claim 1, wherein an average of three measurements of in-plane retardation taken at the width-directional center of the film and the midpoints between the width-directional center and the width-directional ends of the film is more than 400 nm and less than 5,000 nm, and the difference between the largest and the smallest of the three measurements of in-plane retardation is 10% or less of the average of the three measurements.

8. The laminate film as set forth in claim 1, wherein there exist two or less extremes in a light intensity spectrum obtained by measuring the reflection light intensity in the ranges of 0°≤θ≤40° and 50°≤θ≤90° in a variable angle photometry and plotting it on a graph with angle (°) on the horizontal axis and reflection light intensity on the vertical axis.

9. The laminate film as set forth in claim 1, wherein when measuring a thermal shrinkage force in the orientation direction (X direction) of the film and in the direction perpendicular to the orientation direction (Y direction) of the film, the rising-up temperature is 90° C. or higher in both the X direction and the Y direction, and the shrinkage force at 90° C. or higher and 130° C. or lower is 250 µN or less.

* * * * *